(12) United States Patent
Hajjar

(10) Patent No.: US 9,819,923 B2
(45) Date of Patent: Nov. 14, 2017

(54) SELF ALIGNING IMAGER ARRAY

(71) Applicant: PRYSM, Inc., San Jose, CA (US)

(72) Inventor: Roger A. Hajjar, San Jose, CA (US)

(73) Assignee: PRYSM, INC., San Jose, CA (US)

( * ) Notice: Subject to any disclaimer, the term of this patent is extended or adjusted under 35 U.S.C. 154(b) by 0 days.

(21) Appl. No.: 15/356,784

(22) Filed: Nov. 21, 2016

(65) Prior Publication Data

US 2017/0078632 A1  Mar. 16, 2017

Related U.S. Application Data

(63) Continuation of application No. 14/247,558, filed on Apr. 8, 2014, now Pat. No. 9,532,016.
(Continued)

(51) Int. Cl.
*H04N 9/31* (2006.01)
*G02B 7/00* (2006.01)
*G02B 26/12* (2006.01)

(52) U.S. Cl.
CPC ........... *H04N 9/3194* (2013.01); *G02B 7/005* (2013.01); *G02B 26/127* (2013.01); *H04N 9/317* (2013.01); *H04N 9/3129* (2013.01); *H04N 9/3135* (2013.01); *H04N 9/3138* (2013.01); *H04N 9/3161* (2013.01)

(58) Field of Classification Search
CPC .......... H04N 9/31; G02B 26/10; G02B 26/12; G02B 27/32; G09G 3/02
See application file for complete search history.

(56) References Cited

U.S. PATENT DOCUMENTS 7,878,657 B2  2/2011 Hajjar
7,884,816 B2  2/2011 Burroughs et al.
(Continued)

FOREIGN PATENT DOCUMENTS

EP  2 168 115 A1  3/2010
EP  2 788 814 A1  10/2014
(Continued)

OTHER PUBLICATIONS

Matsushita Electric Industrial Co. Ltd.; "Edge-Bending Adjustment Manuel"; Panasonic AVC Networks Company; Projector Business Unit; Sales Group; Version 1.0; dated Feb. 2008.
Garcia-Dorado, I. et al.; "Fully Automatic Multi-Projector Calibration with and Uncalibrated Camera"; 2011 IEEE Computer Society Conference on Computer Vision and Pattern Recognition Workshops ; dated Jun. 2011; 8 total pages.
(Continued)

*Primary Examiner* — Sultan Chowdhury
*Assistant Examiner* — Danell L Owens
(74) *Attorney, Agent, or Firm* — Patterson & Sheridan, LLP

(57) ABSTRACT

Implementations described herein generally relate to scanning beam display systems and more specifically, to systems and methods for improved image alignment of such scanning beam display systems. The method comprises providing a display system comprising a display screen having a plurality of display screen region each with a corresponding light engine module having a servo laser beam and an excitation laser beam, scanning the servo laser beam of a light engine module in an outer scanning region outside of the light engine module's corresponding display screen region, detecting servo laser beam feedback light to measure an alignment error of the light engine module relative to the light engine module's corresponding display screen region, and adjusting alignment of the excitation laser beam based on the measured alignment error.

20 Claims, 18 Drawing Sheets

Related U.S. Application Data

(60) Provisional application No. 61/810,623, filed on Apr. 10, 2013.

(56) References Cited

U.S. PATENT DOCUMENTS

| | | |
|---|---|---|
| 8,556,430 B2 | 10/2013 | Hajjar et al. |
| 2007/0014318 A1 | 1/2007 | Hajjar et al. |
| 2010/0097678 A1 | 4/2010 | Hajjar et al. |
| 2011/0255057 A1 | 10/2011 | Becouarn et al. |
| 2011/0298695 A1 | 12/2011 | Hajjar et al. |
| 2011/0298820 A1 | 12/2011 | Hajjar |
| 2013/0083082 A1 | 4/2013 | Bukesov |

FOREIGN PATENT DOCUMENTS

| | | |
|---|---|---|
| GB | 2481120 A | 12/2011 |
| GB | 2481127 A | 12/2011 |
| GB | 2486387 A | 6/2012 |

OTHER PUBLICATIONS

Brown, M. et al. "Camera-Based Calibration Techniques for Seamless Multi-Projector Displays"; IEEE Transactions on Visualization and Computer Graphics; vol. 11, Issue 2, dated Jan. 2005; 16 total pages.

Search report and examination report for GB1406510.6; dated Oct. 30, 2014.

Chinese Office Action (with attached English translation) for Application No. 201410142366.2; dated Dec. 18, 2015; 18 total pages.

Chinese Office Action (with attached English translation) for Application No. 201410142366.2; dated Jul. 6, 2016; 9 total pages.

Combined Search and Examination Report for Application No. GB1619483.9; dated Dec. 15, 2016; 6 total pages.

United Kingdom Intellectual Property Office; Examination Report for Application No. GB1619483.9; dated May 15, 2017; 5 total pages.

United Kingdom Intellectual Property Office; Search and Examination Report for Application No. GB1619483.9; dated Aug. 21, 2017; 5 total pages.

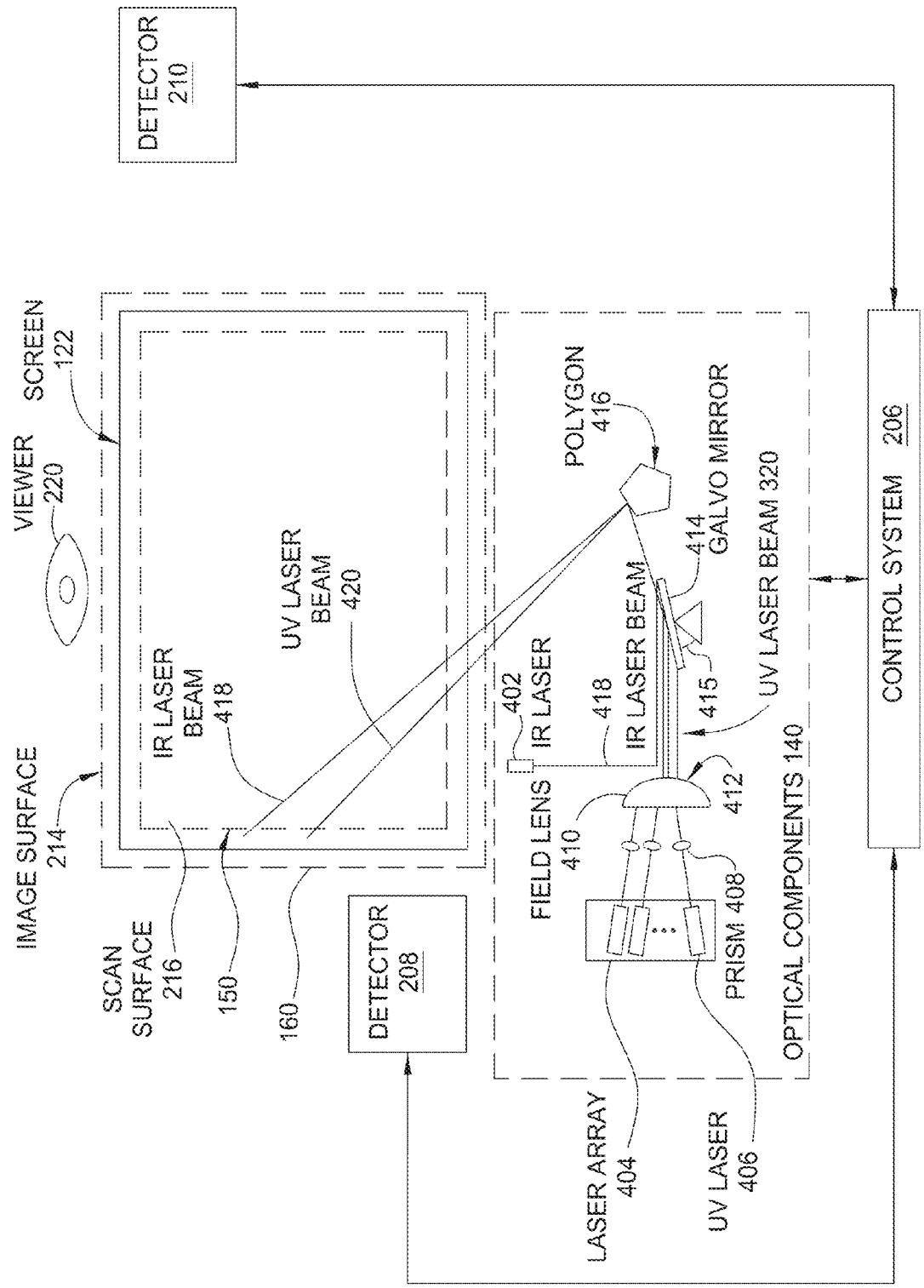

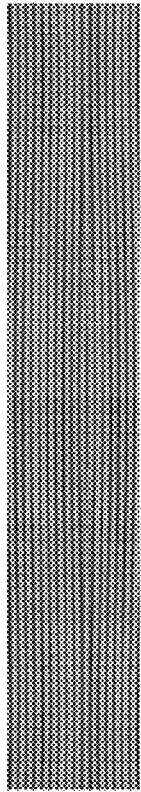
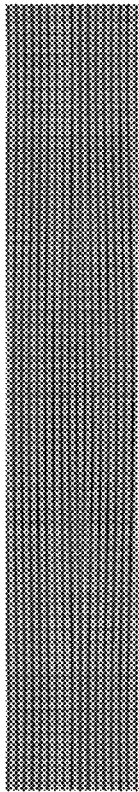
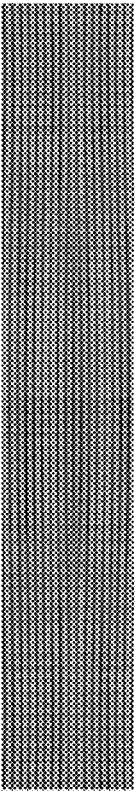
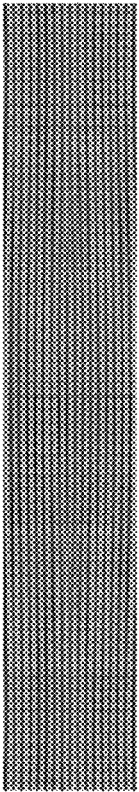
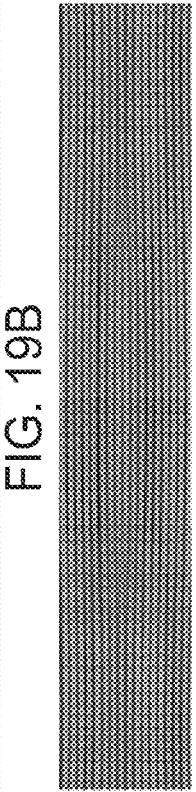
FIG. 16B  FIG. 17B  FIG. 18B  FIG. 19B  FIG. 20B
FIG. 16A (PRIOR ART)  FIG. 17A (PRIOR ART)  FIG. 18A (PRIOR ART)  FIG. 19A (PRIOR ART)  FIG. 20A (PRIOR ART)

SELF ALIGNING IMAGER ARRAY

CROSS-REFERENCE TO RELATED APPLICATIONS

This application is a continuation of U.S. patent application Ser. No. 14/247,558, filed Apr. 8, 2014, which application claims benefit of U.S. Provisional Patent Application Ser. No. 61/810,623, filed Apr. 10, 2013, both of what are herein incorporated by reference in their entirety.

BACKGROUND

Field

Implementations described herein generally relate to scanning beam display systems and more specifically, to systems and methods for improved image alignment of such scanning beam display systems.

Description of the Related Art

Electronic display systems are commonly used to display information from computers and other sources. Typical display systems range in size from small displays used in mobile devices to very large displays, such as tiled displays, that are used to display images to thousands of viewers at one time. One type of display system is a scanning beam display system. Scanning beam display systems may be made up of multiple smaller individual display devices, or "tiles", that are carefully aligned when assembled to provide a seamless (or seamless-like) and uniform appearance. In some implementations, each tile may be a light-based electronic display device, such as a laser-phosphor display (LPD), including a self-contained laser-based image-generating system.

Alignment of scanning beam display systems may be achieved using mechanical and electronic means. However, currently known alignment procedures often require a complex infrastructure, are labor intensive and require a great deal of time and expense to maintain. Other known alignment procedures involve the use of one or more cameras to observe the initial relaxed alignment of the tiled display. Information obtained from the cameras is used to make the necessary adjustments to properly align the tiles of the tiled display. However, these camera alignment techniques require cameras and support hardware to digitize video signals thus adding additional costs.

Therefore, what is needed in the art is a cost-effective alignment technique for scanning beam display systems that compensates for misalignment of the scanning beam display system while maintaining the quality of a displayed image.

SUMMARY

Implementations described herein generally relate to scanning beam display systems and more specifically, to systems and methods for improved image alignment of such scanning beam display systems. In one implementation, a scanning beam display system is provided. The scanning beam display system comprises a continuous surface display screen comprising a plurality of layers and a plurality of reference marks disposed on at least one of the layers, a first light engine module for conveying first image information by directing and emitting spatially and temporally controlled instances of excitation light in a first given area of the continuous surface display screen, a first servo system for determining placement of the emitted excitation light in the first given area of the continuous surface display screen, wherein at least one reference mark of the plurality of reference marks is used to determine placement of the emitted excitation light, a second light engine module for conveying second image information by directing and emitting spatially and temporally controlled instances of excitation light in a second given area of the continuous surface display screen, and a second servo system for determining placement of the emitted excitation light in the second given area of the continuous surface display screen, wherein at least one reference mark of the plurality of reference marks is used to determine placement of the emitted excitation light, a control unit operable to determine the correspondence between the determined placement of the emitted spatially and temporally controlled instances of excitation light in the first given area of the display screen and the determined placement of the emitted spatially and temporally controlled instances of excitation light in the second given area of the display screen, instruct the first light engine module to convey a first image sub-image in a first given sub-area of the display screen, and instruct the second light engine module to convey a second sub-image in a second given sub-area of the display screen.

In another implementation, a scanning beam display system is provided. The scanning beam display system may comprise a display screen assembly. The display screen assembly further comprises a display screen comprising a phosphor material and a self-supporting frame for supporting the display screen. The scanning beam display system further comprises an array of light engine modules, each light engine module having one or more scanning laser beams for exciting the phosphor material on the display screen, wherein the array of light engine modules stands independent of the display screen. The display screen may comprise a plurality of display screen regions, each with one or more corresponding light engine modules of the array of light engine modules. The display screen may comprise a tilette. The light engine modules of the array of light engine modules may be positioned in a support rack. Each display screen region may be positioned adjacent to another display screen region.

In another implementation, a display system is provided. The display system comprises a screen. The screen comprises an imaging portion comprising a plurality of display screen regions and a non-imaging portion extending outward from the imaging portion to an outer perimeter of the screen, wherein the material of the non-imaging portion has the ability to distribute tension. The display system further comprises a self-supporting frame for supporting the screen and a tensioner for coupling the non-imaging portion of the screen with the self-supporting frame. Each display screen region may comprise a phosphor material. The display system may further comprise an array of light engine modules, each light engine module having one or more scanning laser beams for exciting the phosphor material on the display screen region, wherein the array of light engine modules stands independent of the screen. The tensioner may be selected such that a desired tension is maintained between the screen and the self-supporting frame. Each display screen region may comprise a tilette.

In yet another implementation, a method for aligning a scanning beam display system is provided. The method comprises providing a display system comprising a display screen having a plurality of display screen region each with a corresponding light engine module having a servo laser beam and an excitation laser beam, scanning the servo laser beam of a light engine module in an outer scanning region outside of the light engine module's corresponding display screen region, detecting servo laser beam feedback light to measure an alignment error of the light engine module relative to the light engine module's corresponding display screen region, and adjusting alignment of the excitation laser beam based on the measured alignment error.

In yet another implementation, a method for aligning a scanning beam display system is provided. The method comprises providing a display system comprising a display screen having a plurality of display screen regions each with a corresponding light engine module having a servo laser beam and an excitation laser beam, scanning the servo laser beam of a light engine module in an outer scanning region outside of the light engine module's corresponding display screen region, detecting servo laser beam feedback light to determine a position of the light engine module relative to an adjacent display screen region and imaging a portion of the adjacent display screen region using the excitation laser beam.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

So that the manner in which the above recited features of the present invention can be understood in detail, a more particular description of the invention, briefly summarized above, may be had by reference to implementations, some of which are illustrated in the appended drawings. It is to be noted, however, that the appended drawings illustrate only typical implementations of this invention and are therefore not to be considered limiting of its scope, for the invention may admit to other equally effective implementations.

FIG. 4A illustrates a schematic of one implementation of the continuous surface display system 100 of FIG. 2 in greater detail, according to one implementation;

FIG. 16A illustrates an image that is uncorrected for image overlap;

FIG. 16B illustrates a version of the image of FIG. 16A corrected for image overlap according to implementations described herein;

FIG. 17A illustrates an image that is uncorrected for image overlap;

FIG. 17B illustrates a version of the image of FIG. 17A that has been corrected for image overlap according to implementations described herein;

FIG. 18A illustrates an image that is uncorrected for image overlap;

FIG. 18B illustrates a version of the image of FIG. 18A that has been corrected for image overlap according to implementations described herein;

FIG. 19A illustrates an image that is uncorrected for image overlap;

FIG. 19B illustrates a version of the image of FIG. 19A that has been corrected for image overlap according to implementations described herein;

FIG. 20A illustrates an image that is uncorrected for image overlap; and

FIG. 20B illustrates a version of the image of FIG. 20A that has been corrected for image overlap according to implementations described herein.

For clarity, identical reference numbers have been used, where applicable, to designate identical elements that are common between figures. It is contemplated that features of one implementation may be incorporated in other implementations without further recitation.

DETAILED DESCRIPTION

Figure 1:
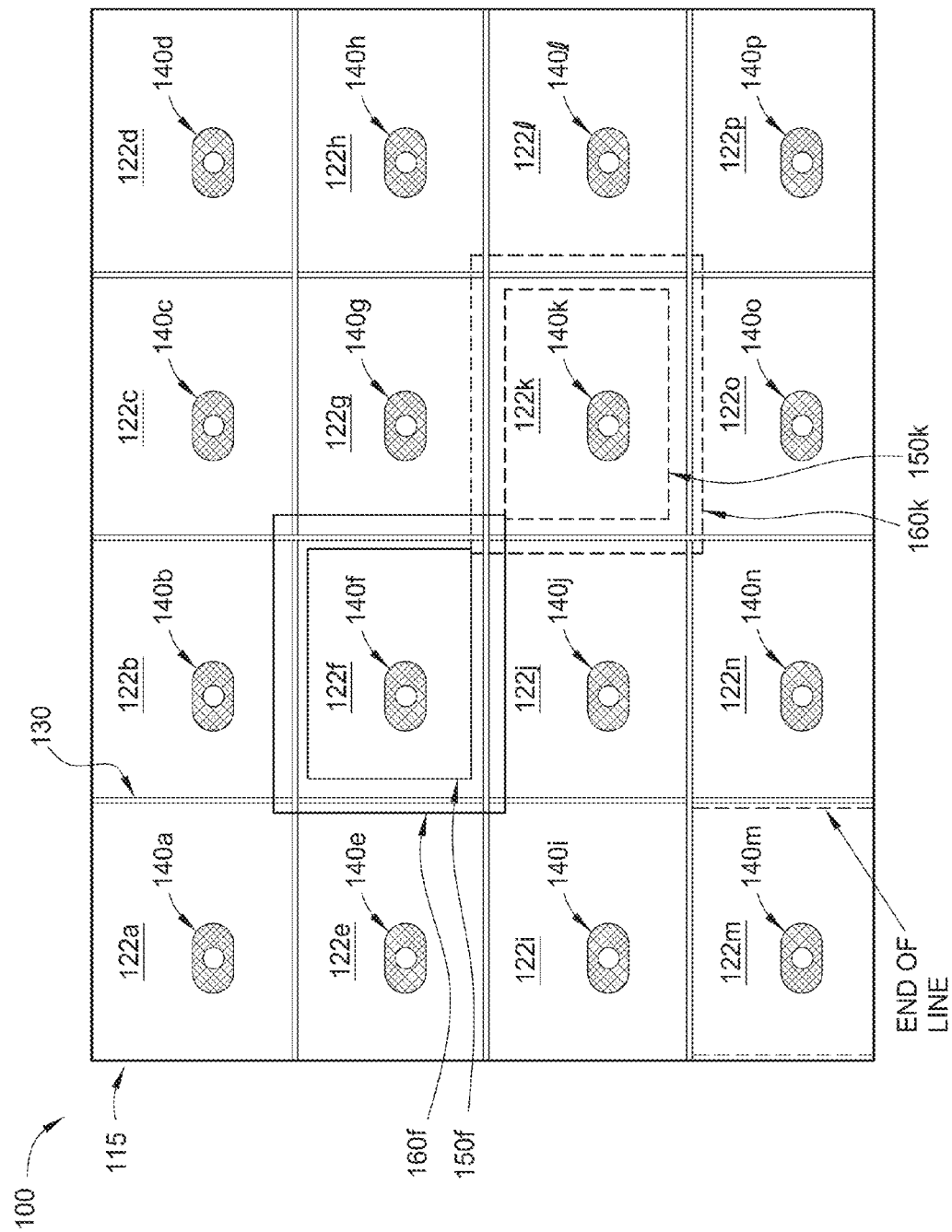
FIG. 1 illustrates a schematic view of one implementation of a continuous surface display system according to implementations described herein.

Implementations described herein generally relate to scanning beam display systems and more specifically, to systems and methods for improved image alignment of such scanning beam display systems. Examples of scanning beam display systems in this application use screens with light-emitting materials or fluorescent materials to emit light under optical excitation to produce images, including laser video display systems. Various examples of screen designs with light-emitting or fluorescent materials can be used. In one implementation, for example, three different color phosphors that are optically excitable by the laser beam to respectively produce light in red (R), green (G), and blue (B) colors suitable for forming color images may be formed on the screen as pixel dots or repetitive red, green and blue phosphor stripes in parallel.

Phosphor materials are one type of fluorescent materials. Various described systems, devices and features in the examples that use phosphors as the fluorescent materials are applicable to displays with screens made of other optically excitable, light-emitting, non-phosphor fluorescent materials. For example, quantum dot materials emit light under proper optical excitation and thus can be used as the fluorescent materials for systems and devices in this application. More specifically, semiconductor compounds such as, among others, CdSe and PbS, can be fabricated in the form of particles with a diameter on the order of the exciton Bohr radius of the compounds as quantum dot materials to emit light. To produce light of different colors, different quantum dot materials with different energy band gap structures may be used to emit different colors under the same excitation light. Some quantum dots are between 2 and 10 nanometers in size and include approximately tens of atoms such between 10 to 50 atoms. Quantum dots may be dispersed and mixed in various materials to form liquid solutions, powders, semi-solid matrix materials and solids (e.g., solid solutions). Quantum dot films or film stripes may be formed on a substrate as a screen for a system or device in this application. In one implementation, for example, three different quantum dot materials can be designed and engineered to be optically excited by the scanning laser beam as the optical pump to produce light in red, green, and blue colors suitable for forming color images. Such quantum dots may be formed on the screen as pixel dots arranged in parallel lines (e.g., repetitive sequential red pixel dot line, green pixel dot line and blue pixel dot line).

Examples of scanning beam display systems described herein use at least one scanning laser beam to excite color light-emitting materials deposited on a screen to produce color images. The scanning laser beam is modulated to carry images in red, green and blue colors or in other visible colors and is controlled in such a way that the laser beam excites the color light-emitting materials in red, green and blue colors with images in red, green and blue colors, respectively. Hence, the scanning laser beam carries the images but does not directly produce the visible light seen by a viewer. Instead, the color light-emitting fluorescent materials on the screen absorb the energy of the scanning laser beam and emit visible light in red, green and blue or other colors to generate actual color images seen by the viewer.

Laser excitation of the fluorescent materials using one or more laser beams with energy sufficient to cause the fluorescent materials to emit light or to luminesce is one of various forms of optical excitation. In other implementations, the optical excitation may be generated by a non-laser light source that is sufficiently energetic to excite the fluorescent materials used in the screen. Examples of non-laser excitation light sources include various light-emitting diodes (LEDs), light lamps and other light sources that produce light at a wavelength or a spectral band to excite a fluorescent material that converts the light of a higher energy into light of lower energy in the visible range. The excitation optical beam that excites a fluorescent material on the screen can be at a frequency or in a spectral range that is higher in frequency than the frequency of the emitted visible light by the fluorescent material. Accordingly, the excitation optical beam may be in the violet spectral range and the ultra violet (UV) spectral range, e.g., wavelengths under 420 nm. In the examples described below, UV light or a UV laser beam is used as an example of the excitation light for a phosphor material or other fluorescent material and may be light at other wavelength.

As used herein, the terms "display screen region," "tilette," "panelette," "panel stack," "panel tiles," and image emission module may refer to the individual servo/phosphor/contrast layer panels, which can be placed together side-by-side to create a large panel display screen or tilette array. Tilettes may be composed of the standard layers of a Laser Phosphor Display panel. The tilettes may include a Fresnel lens layer which normalizes the angled incident excitation beams to the panel; a servo layer, which in conjunction with the servo beam permits the detected reflected beam to guide positioning and timing information to the excitation drivers and beam positioners; a co-extruded dichroic filter layer, which passes excitation light and reflects visible light; a phosphor layer, which has a repeating structure of distinct colored light emitting phosphors; a standoff layer, which physically separates the phosphor layer from the next layer; a color filter layer, which permits only the intended light to the pass from the phosphor layer to the viewer; and a UV block layer that filters any remaining excitation light from passing through to the viewer. The tilette array may be held together in a manner described below and as a whole may be attached to a framing structure, which may also hold the optical components or "light engine modules".

In certain implementations, the display screen is an array of pixels, which may be segmented into regions of pixels. One region of pixels may be a tilette that is a distinct layer of image emitting material, where the pixels are individual subregions of the image emitting material.

In certain implementations, an alignment feedback system is used for each light engine module to identify the location of each scanning beam on the display screen. The alignment feedback system allocates certain pixels for the scanning beam to image and positions those pixels in the identified known location on the screen to create a continuous image across all light engine modules.

In certain implementations, image pixel information is the image information that the control system determines which designated pixel region of the display is to convey the identified image pixel information. In some instances the same image pixel information may be imaged on the display screen in the common pixel region by two or more light engines.

In certain implementations since the placement of each light engine module relative to its corresponding tilette may not be precise, it may be necessary to overscan the scanning beam of the light engine module to locate reference marks, e.g., the start of line ("SOL") or end of line (EOL) reference marks, on an adjacent tilette that is in proximity to the particular light engine module and the light engine module's corresponding tilette. Detecting reference marks on an adjacent tilette requires overscanning the scanning beam of the light engine module from where the actual imaging will be induced on the corresponding tilette to an adjacent tilette.

In certain implementations, each light engine module is aligned with a corresponding tilette in a continuous seamless screen, but the physical placement of the tilettes within the seamless screen relative to each corresponding light engine module may not be perfect. The light engine modules may or may not be positioned in a stand-alone rack which may be affixed to the continuous seamless screen or there may be a fixture holding the screen to the rack of light engine modules. Either way each light engine module needs to locate the position of the light engine module's corresponding tilette on which the light engine module is to convey the imaging information for imaging.

In certain implementations by using the servo beam of the light engine module in combination with the reflective markings on the screen, the light engine module determines the position or position offset of the light engine module's corresponding tilette relative to the light engine module. Since each tilette is adjacent to each other tilette, the servo system of each light engine module may scan beyond the tilette of interest to an adjacent tilette. The reason for this is not necessarily to scan on the adjacent tilette, but to be able to locate the light engine module's corresponding tilette of interest if the tilette is shifted too far in one direction or another from the normal proximity of the light engine module. This alignment technique permits for initial significant coarse alignment of each tilette relative to its corresponding light engine module. This initial crude alignment can then be compensated for using the servo system's identification of the tilette of interest followed by affecting the light engine module to display the appropriated image on the screen.

In certain implementations, affecting the light engine module may involve shifting the scanning beam vertically by an adjustment of the galvo mirror to ensure proper overlap horizontally between the emissive areas. This in addition to adjusting the intensity of the scan beams helps ensure proper seam blend. Seam blending by intensity control may also be applied in the vertical seam direction. Shifting horizontally may be performed by adjusting the timing of the pulse on/off in conjunction with the known position of the beam as the polygon scans.

In certain implementations, each light engine module uses at least one servo scanning beam, e.g., an IR scanning beam, impinging in a time sequence matter on the screen in the region where a start of line ("SOL") is expected.

In certain implementations for aligning tilettes side-by-side, the servo-system relies on a start of line or end of line feedback technique.

In certain implementations, the overscan capability (both the servo beam and the excitation beam may be scanned outside the region of its corresponding tilette) of each light engine module may be used to image not only onto the light engine module's proximity tilette but also at least partially onto its adjacent or neighbor tilette.

In certain implementations, various alignment mechanisms are provided in this specification to maintain proper alignment of a scanning beam on a desired sub-pixel to achieved desired image quality. These alignment mechanisms include reference marks on the screen, both in the fluorescent area and in one or more peripheral areas outside the fluorescent area, to provide feedback light that is caused by the excitation beam or a separate dedicated servo beam and represents the position and other properties of the scanning beam on the screen. The feedback light can be measured by using one or more optical servo sensors to produce a feedback servo signal. A servo control in the light engine module processes this feedback servo signal to extract the information on the beam positioning and other properties of the beam on the screen and, in response, adjust the direction and other properties of the scanning beam to ensure the proper operation of the display system.

For example, a feedback servo control system can be provided to use peripheral servo reference marks positioned outside the display area unobservable by the viewer to provide control over various beam properties, such as the horizontal positioning along the horizontal scanning direction perpendicular to the fluorescent stripes, the vertical positioning along the longitudinal direction of the fluorescent stripes, the beam focusing on the screen for control the image sharpness, and the beam power on the screen for control the image brightness.

In certain implementations for facilitating imaging onto adjacent tilettes, the servo-scan system, i.e., the servo beam and servo beam detector, recognizes the reference marks (e.g., start of line reference marks, end of line reference marks, and other lines within the tilette) that are carefully aligned to the phosphor stripes from an adjacent tilette and from there, the servo-system will know its range of imaging pixels on the adjacent tilette. For example, the light engine module control system is aware of its raster scan range in both the vertical and horizontal so knowing the position of the end of line reference marks of an adjacent tilette; the light engine module can determine its spatial range of imaging pixels on the adjacent tilettes and communicate this information to the corresponding adjacent light engine module.

In another implementation for aligning the top and bottom, there may be reference marks on each tilette or on the EOL mask indicating the top and bottom regions of each tilette. Overscanning the servo system on the bottom portion of the light engine module would overlap the tilette associated with the light engine module under the overscanning light engine module. The light engine module's detection of the servo mark on the top of the lower light engine module tilette permits the light engine module to know where the top image row is for that particular tilette and apply image light excitation to the one or more top pixel region rows. With this process, it is possible for the top and bottom light engine module to simultaneously excite the common row of pixels on the one tilette (though from two distinct light engine modules). This may have the advantage of either brightening that row of pixels or permitting a blending of light excitation to the common pixel row. This would mean that both light engine modules overlap on and provide the same image pixel information to a tilette intended for one or the other light engine module. The overlap described would also mean that both adjacent light engine modules might present the same pixel row image information.

In certain implementations, the overscan region may be fixed on deterministic. For example, the servo system may allow for the scan to end at a determined location or the system may define a region that is expected to be greater than the area of an expected tilette by a certain amount.

In certain implementations the whole screen may shift during imaging operation, therefore the overscanning to determine which pixels to operate may take place dynamically (i.e., the pixel associated with a particular tilette or light engine module may change a few times over the course of a period of time) during normal operation of the video imaging.

In certain implementations, the wall of light engine modules and the wall of the display screen may not have any physical means of associating a particular tilette to a particular light engine module. In essence the tilettes within the seamless screen and the wall of light engine modules are physically adjacent to each other, but not affixed to each other, however with the above discussed alignment procedure, this detachment does not inhibit a uniform aligned image to be produced across the whole screen.

In certain implementations, the screen of tilettes is a free hanging screen. The free-hanging screen may have the tilettes embedded within a screen layer or layers that is larger than the imaging portion of the screen or the array of tilettes may be laminated to screen layer, which may be a single sheet comprising the tilette array. The non-imaging portion of the screen may have material that allows for the screen to be under mostly uniform tension. The material may either be merely an extension of the screen layer material, a thicker portion of the screen layer material or may have some additional material that helps distribute the tension pressure (e.g., a bar, another plyable material, etc.). Attached to the non-imaging portion is some means to attach an external frame. In one implementation, the attachment member is a set of spring tensioners that have a tension based on the weight and size of the screen under tension. The number of attachment members will vary depending upon the weight and size of the screen to under tension as well as the number of tensioners used. The number of attachment members may vary as well depending upon the weight, size, and desired uniform tautness of and across the screen.

FIG. 1 illustrates a schematic front view of one implementation of a continuous surface display system 100 used to display an image or "super-image" according to implementations described herein. The image or "super-image" may be considered to contain multiple portions sometimes referred to as sub-images, regions-of-interest, ROIs, or simply regions. Specific image processing operations may be applied to selected sub-images. Thus one part of an image (region) might be processed to suppress motion blur while another part might be processed to improve color rendition. The continuous surface display system 100 is a light-based electronic display device configured to produce video and static images for a viewer using light-emitting phosphors. For example, the continuous surface display system 100 may be a laser-phosphor display (LPD), a light-emitting diode (LED) digital light processing (DLP), or other phosphor-based display device.

As depicted in FIG. 1, the continuous surface display system 100 comprises a display screen 115 and a plurality of light engine modules 140a-p. Each light engine module 140a-140p may be configured to convey a portion of the image information or sub-image information. The display screen 115 may comprise phosphor regions (see FIG. 6) that may be phosphor stripes, phosphor dots or other arrangements of the phosphors. The display screen 115 comprises a plurality of display screen regions 122a-122p (e.g., sub-areas) each configured to display a portion of the image (e.g., a sub-image). In some implementations, the display screen regions 122a-122p are defined regions of a continuous sheet or sheets. In some implementations, the display screen regions 122a-122p comprise a plurality of separate display screen modules or "tilettes" that when placed adjacent to each other form the display screen 115 having a continuous uniform surface. In certain implementations, the display screen 115 may comprise an "array" of tilettes. The display screen modules may be supported by a visible light transparent support structure 130. It should be noted that although sixteen display screen regions 122a-p (hereinafter 122) are depicted in FIG. 1, any plurality of display screen regions may be used with the implementations described herein. The display screen 115 can be manufactured in transportable sizes and the display screen can be rolled for easy transport to the final install location in its unrolled state.

The display system 100 further comprises a plurality of light engine modules 140a-p (hereinafter 140) that are each used to produce one or more scanning laser beams (not shown) to excite the phosphor material on the display screen 115. Each light engine module 140a-p may include multiple laser beams selected from the group consisting of one or more of an excitation lasers, one or more servo feedback lasers, and combinations thereof. The lasers may be configured with appropriate focus and scanning mechanisms and optics. The light engine module 140a-p is typically arranged to associate with a corresponding display screen region 122a-p. It is possible for a single light engine module to excite more than one display screen region, for example, the corresponding or proximal display screen region and one or more adjacent display screen regions.

Generally there is one light engine module 140a-p per each display screen region 122a-p, although the light engine modules 140a-140p have overscanning capability, meaning that the scanning beams of each light engine module can not only excite its corresponding display screen region but also has the capability to excite one or more adjacent display screen regions. For example, as shown in FIG. 1, the scanning beams of light engine module 140f have the capability to scan within an inner scanning region as designated by outline 150f and an outer scanning region as designated by outline 160f. As shown by the outer scanning region 160f, the scanning beams of light engine module 140f have access to adjacent display screen regions 122a, 122b, 122c, 122e, 122g, 122i, 122j, and 122k. An inner scanning region 150k and outer scanning region 160k are also shown for the light engine module 140k of display screen region 122k. As shown by the outer scanning region 160k, the scanning beams of light engine module 140k have access to adjacent display screen regions 122f, 122g, 122h, 122j, 122l, 122n, 122o, and 122p. It should be understood that although an inner scanning region and outer scanning region are only shown for light engine modules 140f and 140k, all of the light engine modules 140a-p may have this capability.

Figure 2:
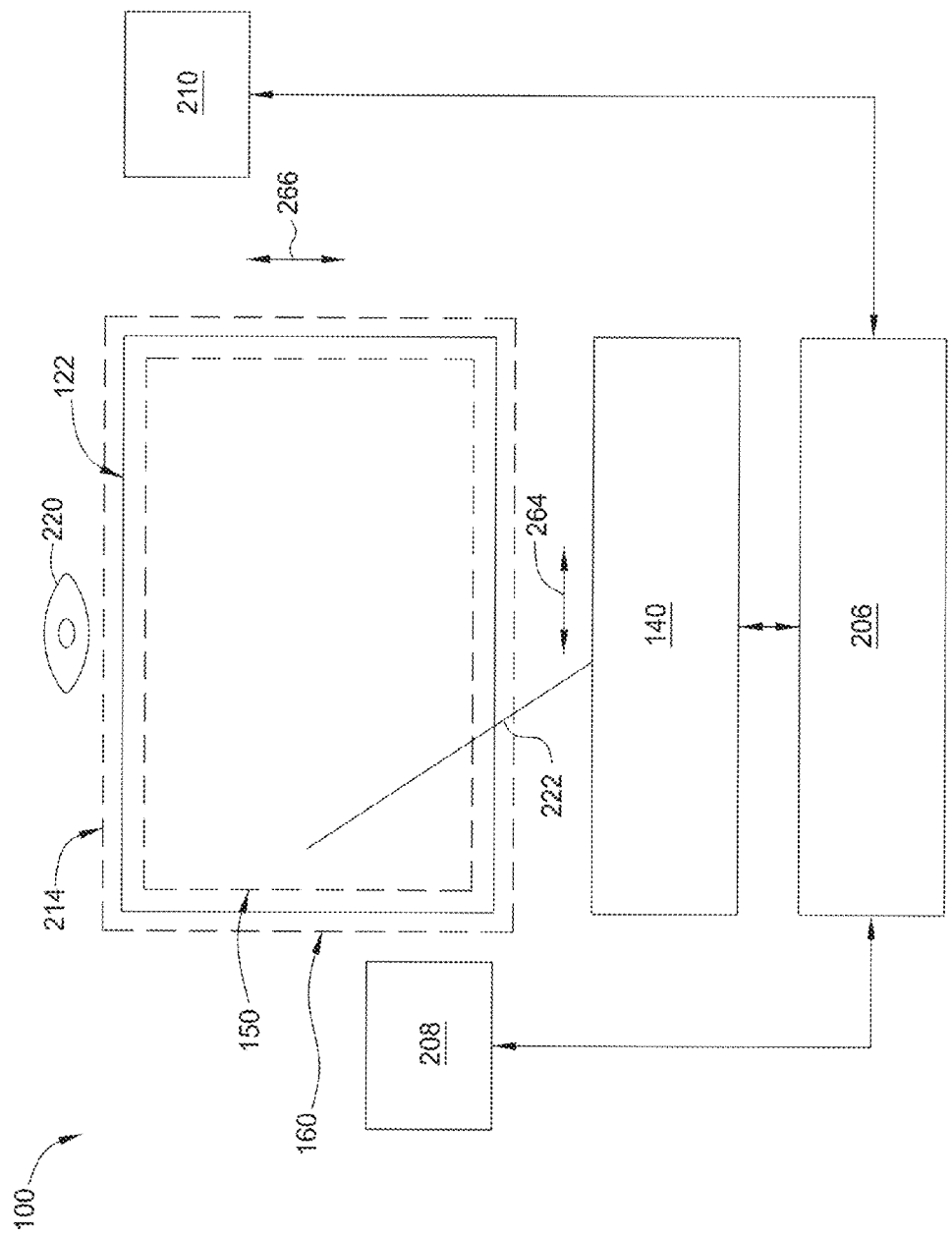
FIG. 2 illustrates a partial schematic view of one implementation of a portion of the continuous surface display system of FIG. 1 according to implementations described herein.

FIG. 2 illustrates a partial schematic view of one implementation of a portion of the continuous surface display system 100 of FIG. 1 according to implementations described herein. As shown, the display system 100 includes display screen region 122, light engine module 140, a control system 206, a servo detector 208 and an excitation detector 210. The display screen region 122 includes on opposite sides thereof an image surface 214 and a scan surface 216. The image surface 214 is on an external side of an optional housing (not shown) that encloses the components of the display system 100. The image surface 214 is configured to display digital images that are visible to a viewer 220. The scan surface 216 is on an internal side of the housing that encloses the components of the display system 100.

The light engine module 140 is configured to emit one or more scanning beams (e.g., laser beams 222) onto the scan surface 216 of the display screen region 122. The display screen region 122 includes a phosphor layer (not shown here) that phosphoresces when excited by the optical energy conducted by the laser beam 222, thereby creating visible light. The light engine module 140 is configured to emit one or more laser beams 222 that sweep across the phosphor layer of the display screen region 122 in a pulse width and pulse amplitude modulation manner in order to create visible light that represents an image. The visible light associated with the image emanates through the image surface 214 of the display screen region 122 to the viewer 220. The viewer 220 may then view the image. In this fashion, the display system 100 is configured to cause one or more images to emanate from the image surface 214.

The control system 206 is configured to transmit command data to the light engine module 140 in order to cause the light engine module 140 to emit the laser beams 222 onto the scan surface 216. The control system 206 controls and modulates the laser beams 222 emitted by the light engine module 140 so that the laser beams 222 are modulated to carry the image to be displayed on the screen 122. The control system can include a digital image processor that generates digital image signals for the three different color channels and laser driver circuits that produce laser control signals carrying the digital image signals. The laser control signals are then applied to modulate the lasers, e.g., the currents for laser diodes.

The control system 206 is also configured to control the overscanning capability of the light engine module 140. In doing so, the control system 206 may perform overscanning operations involving the outer scanning region 160 and the servo detector 208, as well as involving the outer scanning region 160 and the excitation detector 210. The control system 206 is described in greater detail below in conjunction with FIG. 3.

Signals from the servo detector 208 can be sent through an electronic "peak" detector that creates an electronic pulse whenever a servo signal is at its highest relative amplitude. The time between these pulses can be measured by a sampling clock in a digital circuit or microcontroller that is used by a processor and the control system 206 to process and generate an error signal for controlling timing of optical pulses in each excitation beam in a horizontal scan. Because the scan speed of the scanning laser beam 222 on the screen region 122 is known, the time between two adjacent pulses from the electronic peak detector can be used to determine the spacing of the two locations that produce the two adjacent electronic pulses. This spacing can be used to determine the subpixel width and subpixel position. Depending on the beam scan rate and the frequency of the sampling clock, there are some nominal number of clocks for each sub-pixel. Due to optical distortions, screen defects or combination of the distortions and defects, the number of clock cycles between two adjacent pulses for any given sub-pixel may vary from the nominal number of clock cycles. This variation in clock cycles can be encoded and stored in memory for each sub-pixel.

The phosphor material may be made up of alternating phosphor stripes (see FIG. 6) of different colors, e.g., red, green, and blue, where the colors are selected so that they can be combined to form white light and other colors of light. The scanning laser beam 222 may be a modulated light beam that includes optical pulses that carry image information and is scanned across display screen 122 along two orthogonal directions, e.g., horizontally (parallel to arrow 264) and vertically (parallel to arrow 266), in a raster scanning pattern to produce an image on the screen 122 for the viewer 220. In some implementations, the scanning laser beam 222 includes visible lasers beams of different colors that discretely illuminate individual pixel elements of the screen 122 to produce an image. In other implementations, the scanning laser beam 222 includes invisible laser beams, such as near-violet or ultra-violet (UV) laser beams that act as excitation beams to excite phosphors on the screen 122. In such implementations, the scanning laser beam 222 is directed to discrete pixel elements that are formed from the phosphor stripes or to portions of the phosphor stripes that act as discrete pixel elements and are made up of light-emitting material that absorbs optical energy from the scanning laser beam 222 to emit visible light and produce an image. Alternatively, the scanning laser beam 222 comprises hybrid visible and invisible lasers. For example, a blue laser can be used to generate blue color on screen 122, and the same blue laser could be used to excite phosphors that emit red and green light when excited. Alternatively, a UV laser may be used to excite phosphors that emit green light when excited, and a red and blue laser may be used to produce red and blue color directly on the screen 122.

In some implementations, the control system 206 is configured to divide the image data for an image or super-image into a number of sub-image data sets, where one sub-image data set is for one sub-image. The number of sub-images and corresponding sub-image data sets typically corresponds to the number of light engine modules required to convey the sub-image information for the particular light engine module for that light engine's identified portion of the continuous surface display screen to collectively produce the full image on the display screen. The control system 206 analyzes the sub-image designated light engine information for unique characteristics (e.g., the excitation beam of a specific light engine fails to excite the phosphor stripes in certain areas or subpixels) to determine the sub-image data set to be presented to the sub-image designated light engine. The control system 206 then instructs the one or more excitation beams of the sub-image designated light engine and an adjacent light engine to use their respective overscanning capability and excite the portions of the phosphor stripes (or portions of stripes associated with the adjacent light engine) for their respective sections of the continuous surface display screen subpixel regions that the excitation beam of the sub-image designated specific light engine fails to adequately excite.

Figure 3:
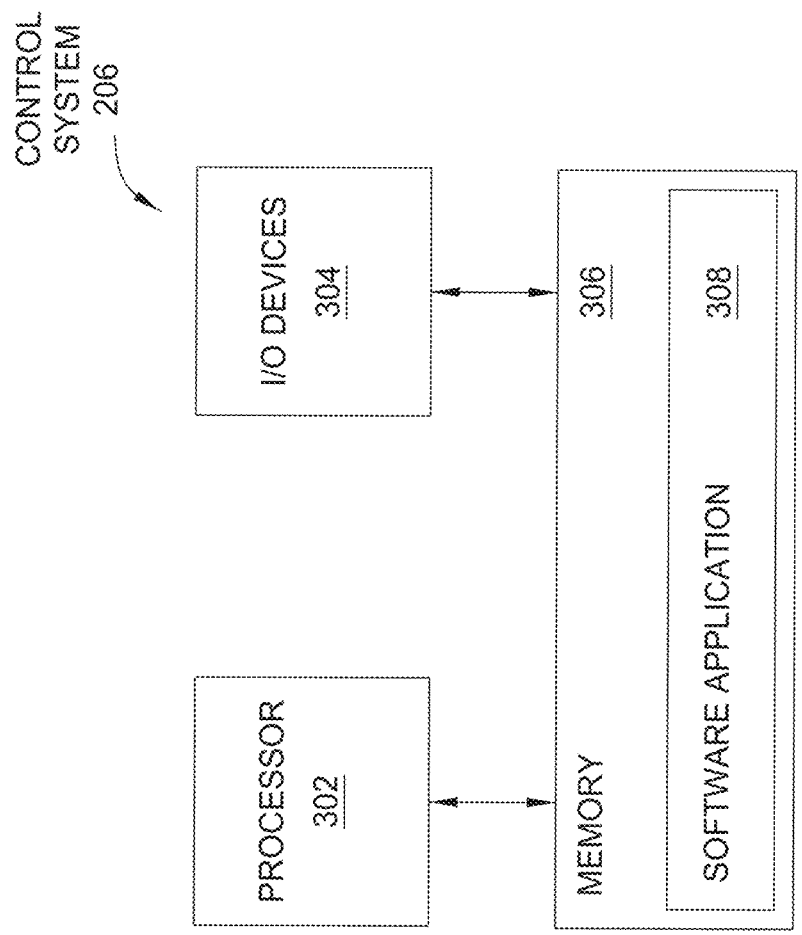
FIG. 3 illustrates a schematic view of one implementation of the control system of FIG. 2 in greater detail.

FIG. 3 illustrates the control system 206, according to one implementation of the invention. As shown, the control system 206 includes a processor 302, one or more input/output (I/O) devices 304, and memory 306. Memory 306 may be any technically feasible type of memory, including a random access memory (RAM) module, a read-only memory (ROM) module, a hard disk, or a flash disk, among others, and stores therein a software application 308 that contain instructions for controlling the operation of the light engine module 140 during display and performing overscanning operations. The processor 302 can be any technically feasible type of processor, including a central processing unit (CPU), a graphics processing unit (GPU), a field-programmable gate array (FPGA), an integrated circuit (IC), an application-specific integrated circuit (ASIC), or a system-on-a-chip (SOC), among others, and is configured to execute software applications, such as the software application 308. Alternatively, the processor 302 may be a dedicated hardware unit configured to perform specific tasks. In implementations where the processor 302 is a dedicated hardware unit, the processor 302 (i) controls the operation of the light engine module 140 and (ii) performs the overscanning operations described herein.

When controlling the operation of the light engine module 140 during display, the processor 302 causes the light engine module 140 to emit the laser beams 222 towards specific positions of the scan surface 216 at specific times in order to cause an image to appear on the image surface 214 of the display screen region 122. When performing alignment operations, the processor 302 causes the light engine module 204 to emit the laser beams 222 to the outer scanning region 160 and towards the inner scanning region 150. The processor 302 then receives feedback signals from the servo detector 208 and the excitation detector 210. The processor 302 then accesses one or more alignment tables (not shown) stored in memory 306. The alignment tables include data representing physical parameters associated with the continuous surface display system 100, such as, for example, a nominal screen size or an angular speed with which the laser beams 222 traverse the scan surface 216. Based on the data stored in the alignment tables and the feedback signals received from the servo detector 208 and the excitation detector 210, the processor 302 then aligns the light engine module 140 with its corresponding display screen region 122 to ensure that a coherent image having a specific resolution and position is generated on the display screen region 122. As shown, the processor 302 is coupled to the I/O devices 304 and to memory 306.

The I/O devices 304 include devices configured to receive input, such as a keyboard, a mouse, or a set of switches, among others. The I/O devices 304 also include devices configured to provide output, such as a speaker or a set of light-emitting diodes (LEDs), among others. The I/O devices 304 may additionally include devices configured to receive input and to provide output, such as a wireless network card, an Ethernet port, or a serial port, among others. The I/O devices 304 may receive data and then write the data to memory 306 or transmit the data to the processor 302. The I/O devices 304 may also read data from memory 306 and transmit the data to an external location.

In general, the control system 206 coordinates the operation of the continuous surface display system 100, including the operation of the light engine modules and performance of the overscanning operations. As described in greater detail below the control system 206 performs a portion of the alignment operations using reference marks and the servo detector 208.

FIG. 4A illustrates a schematic of one implementation of the display system 100 of FIG. 2 in greater detail, according to one implementation. As shown, the control system 206 within the display system 100 includes a servo laser 402, a laser array 404 that includes one or more excitation lasers 406, prisms 408 each optically coupled to one of the excitation lasers 406, a field lens 410 that includes a plurality of lens elements 412, a galvo mirror 414 disposed at an angle 415, and/or a polygon 416 configured to rotate at a predefined angular velocity. The servo laser 402 may be, for example, an infrared (IR) laser, configured to emit a servo laser beam 418, for example, an IR laser beam, while each of the excitation lasers 406 is configured to emit an excitation laser beam 420. Different from the excitation laser beam 420, the servo laser beam 418 is not modulated to carry image data. The servo laser beam 418 has a known spatial relation with the excitation laser beam 420. Therefore, the positioning of the servo laser beam 418 can be used to determine the positioning of the excitation laser beam 420. This relationship between the servo beam and excitation beams can be determined by using reference servo marks such as a start of line mark in a non-viewing area of the screen region 122. The servo detector 208 receives and detects the feedback light to obtain positioning information of the servo beam 418 on the screen region 122 and use this positioning information to control alignment of the excitation laser beam 420 on the screen. The servo laser beam 418 is invisible and does not produce any noticeable visual artifact on the screen region 122 during the normal operation of the system when images are produced on the screen 122.

In the examples described below, violet or a UV laser beam is used as an example of the excitation light for a phosphor material or other fluorescent material and may emit light at a wavelength different from the excitation light wavelength. Those skilled in the art will understand that the servo laser beam 418 and the excitation laser beams 420 (collectively, "laser beams" 222) may each comprise a series of laser pulses. The servo laser 402 is used during alignment and overscanning operations involving the light engine module 140, as described in greater detail below. In the implementations described herein, the servo laser 402 is used for non-imaging sensitive dynamic alignment. In alternative implementations, laser types other than IR, violet and UV may be used for imaging and or dynamic alignment.

In one implementation, during normal operation of the display system 100, each of the excitation lasers 406 emits an excitation laser beam 420 through the prism 408 corresponding to that excitation laser 406. As described in greater detail below, the vertical height of each prism 408 may be adjusted in order to modify the trajectory of the excitation laser beam 420 corresponding to the prism 408. The prism 408 is controlled via a stepper motor (not shown) to shift the excitation laser beam 420 and cause the excitation laser beam 420 to be displaced on the display screen region 122. Each of the prisms 408 is used to control the position of a corresponding UV laser beam 320. The angle 415 of the galvo mirror 414 may be adjusted in order to modify the trajectory of all of the excitation laser beams 420 simultaneously.

Upon passing through the prisms 408, the excitation laser beams 420 are each refracted by a different lens element 412 of the field lens 410. The lens elements 412 refract the excitation laser beams 420 onto the galvo mirror 414, which, in turn, reflects the excitation laser beams 420 towards the polygon 416.

The polygon 416 includes a plurality of mirrored facets. In one implementation, the polygon 416 includes eight mirrored facets. In one implementation, the polygon 416 includes eight mirrored facets. However, those skilled in the art will understand that the polygon 416 may include any number of mirrored facets. As the polygon 416 rotates, different mirrored facets may reflect the excitation laser beams 420 toward the scan surface 216. A scan lens (not shown) may be used to project the excitation laser beams 420 from the polygon 416 onto the display screen region 122. The scan lens may be designed to image each laser onto the screen region 122. When a given mirrored facet reflects the excitation laser beams 420, the rotation of the polygon 416 causes the angle with which that mirrored facet reflects the excitation laser beams 420 to change. Consequently, the rotation of the polygon 416 causes the excitation laser beams 420 to scan, or traverse, the scan surface 216 horizontally. In addition, each mirrored facet of the polygon 416 reflects the excitation laser beams 420 towards a different horizontal band of the scan surface 216. Thus, each mirrored facet of the polygon 416 causes the excitation laser beams 420 to traverse a different horizontal band of the scan surface 216. Further details of the polygon 416 are described in U.S. Patent Application Publication No. 2010/0020377, which is incorporated by reference herein.

The excitation laser beams 420 penetrate the scan surface 216 to a phosphor layer within the display screen region 122. The phosphor layer of the display screen region 122 includes a plurality of vertical stripes or regions of red, green, and blue (RGB) phosphors. Each stripe can be excited independently by the excitation laser beams 420 to produce red, green, and/or blue screen pixels of varying intensity. The light intensity of each screen pixel is a function of the intensity of the excitation laser beam 420 used to excite the phosphor associated with that pixel. By causing the excitation lasers 406 to emit excitation laser beams 420 that excite specific pixels with specific color and intensity values, the control system 206 is capable of causing an image to appear on the image surface 214 of the display screen region 122. In the implementations described herein, excitation laser beams 420 are imaging laser beams and are distinguished from the servo laser beam 418 which is an alignment laser beam. In alternate implementations described herein, any of the laser beams including excitation laser beams 420 and the servo laser beam 418 can be an alignment laser beam.

The excitation laser beams 420 are scanned spatially across the screen region 122 to hit different color pixels at different times. Accordingly, each of the modulated beams 420 carries the image signals for the red, green and blue colors for each pixel at different times and for different pixels at different times. Hence, the beams 420 are coded with image information for different pixels at different times by the control system 206. The beam scanning thus maps the time-domain coded image signals in the beams 420 onto the spatial pixels on the screen region 122. For example, the modulated laser beams 420 can have each color pixel time equally divided into three sequential time slots for the three color subpixels for the three different color channels. The modulation of the beams 420 may use pulse modulation techniques to produce desired grey scales in each color, a proper color combination in each pixel, and desired image brightness.

Figure 4B:
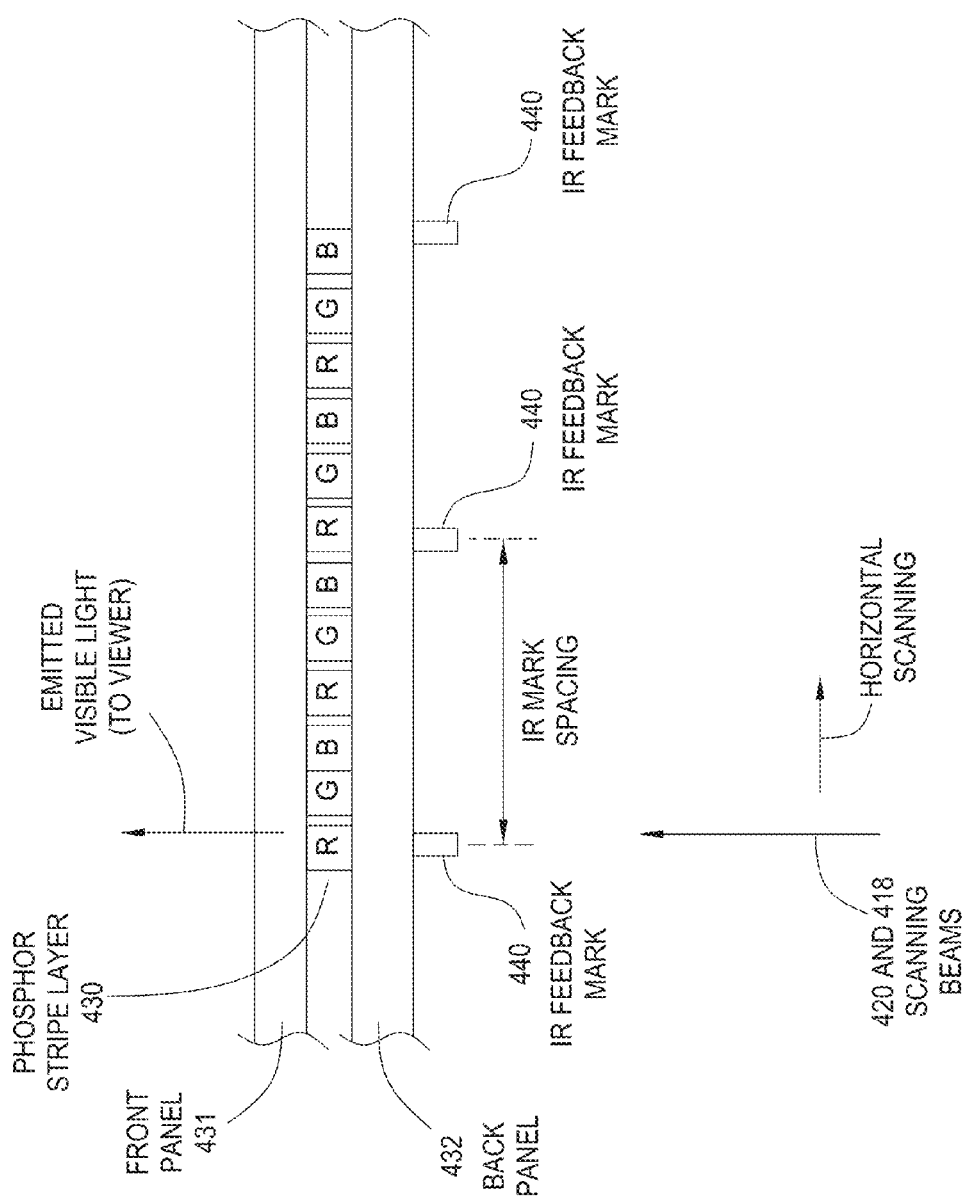
FIG. 4B illustrates a schematic cross-sectional view of one implementation of a screen design that has IR servo feedback marks that do not affect the transmission amount of excitation beams while having a property of diffuse or specular reflection for at least the servo beams.

FIG. 4B illustrates a schematic cross-sectional view of one implementation of a screen design that has IR servo feedback marks that do not affect the transmission amount of excitation beams while having a property of diffuse or specular reflection for at least the servo beams. FIG. 4B shows an example design for the light-emitting display screen region 122 that includes IR feedback marks on the excitation side of the phosphor layer. This screen 122 includes a phosphor stripe layer 430 with parallel phosphor stripes emitting red, green and blue light under excitation of the excitation beam 420, a back panel 432 on the excitation side of the phosphor layer 430 facing the excitation beam 420 and the IR servo beam 418, and a front panel 431 on the viewer side of the phosphor layer 430. In this example, IR feedback marks 440 are formed on the back surface of the back panel to provide the IR servo feedback light 132 by reflecting or scattering the IR servo beam 418. In other implementations, the IR feedback marks 440 may be placed at other positions and can be located on either the excitation side or the viewer side of the phosphor layer 430.

The IR feedback marks 440 are designed to provide position registration of the servo beam 418 on the screen and can be implemented in various configurations. For example, the IR feedback marks 440 can be periodic parallel stripes that are parallel to the parallel phosphor stripes in the phosphor layer 430. An IR feedback mark 440 can be placed at any position relative to a stripe divider or a phosphor stripe in the phosphor layer 430 along the horizontal direction, including a position horizontally displaced from a stripe divider or the center of a phosphor stripe. The width of each of the IR feedback marks 440 can be equal to the width of the beam spot of the IR servo beam 418 on the screen 122 when the detection for the IR servo feedback light is based on a peak detector. IR feedback marks 440 with a width wider than the width of the beam spot of the IR servo beam 418 on the screen 122 can be used if the detection for the IR servo feedback light is based on the position of each IR feedback mark 440 with respect to a position reference such as the SOL mark. The width of the IR feedback marks 440 may be less than the width of each phosphor stripe, e.g., one half of the width of a phosphor stripe. The spacing between two adjacent IR feedback marks 440 can be greater than the spacing between two adjacent phosphor stripes. For example, the IR mark spacing can be 25 mm and the phosphor stripe spacing can be 1.5 mm.

In one embodiment, the servo signal may is an IR signal. The servo IR signal is generated to act with marks on a servo layer, which provide feedback to a servo feedback detector.

The servo signal generator, the servo layer feedback marks and the servo detector may each be on the excitation side of the phosphor layer. The IR feedback marks 440 can be made to be optically different from the surrounding areas. The IR feedback marks 440 may allow for optical reflection of a servo signal which may either be specularly or diffusely reflected off the marks 440 to be registered by the servo detector. The positions of the IR feedback marks 440 on the screen may maintain substantially the same optical transmission for the excitation beam 420 as the areas surrounding and between the IR feedback marks 440. Therefore, the presence of the IR feedback marks 440 does not optically interfere with the optical transmission of the excitation beam 420 by optically imprinting the shapes of the marks 440 on the excitation beam 420 that reaches the phosphor layer of the screen 122. In this regard, the IR feedback marks 440 can be implemented in various configurations. For example, each IR feedback mark 440 can be made to have a smooth surface facing the excitation side and optically specularly reflective to servo light and the areas surrounding and between the IR feedback marks 440 are configured to exhibit optically diffused reflection of the servo light, which spreads in different directions. The specularly reflective IR feedback marks 440 and the diffusively reflective areas surrounding and between the marks 440 have the same optical transmission characteristics. In this implementation the specularly reflected servo light is detected by a servo light detector. Different from the above design of having specularly reflective marks 440 in a diffusive background, the IR feedback marks 440 can also be made diffusively reflective to light and the areas surrounding and between the marks 440 are made specularly reflective. In this implementation the diffusively reflected servo light is detected by a servo light detector. As another example, the IR feedback marks 440 can have a transmissivity or reflectivity at the wavelength of the excitation beam 420 that is significantly different from the wavelength of the servo beam and servo wavelengths. For example, the IR feedback marks 440 can be configured to be optically transparent to light of the excitation beam 420 and optically reflective to light of the servo beam 418 so that the IR feedback marks 440 are optically "invisible" to the excitation beam 420 and reflect the servo beam 418 to produce the IR servo feedback light 132.

Figure 4C:
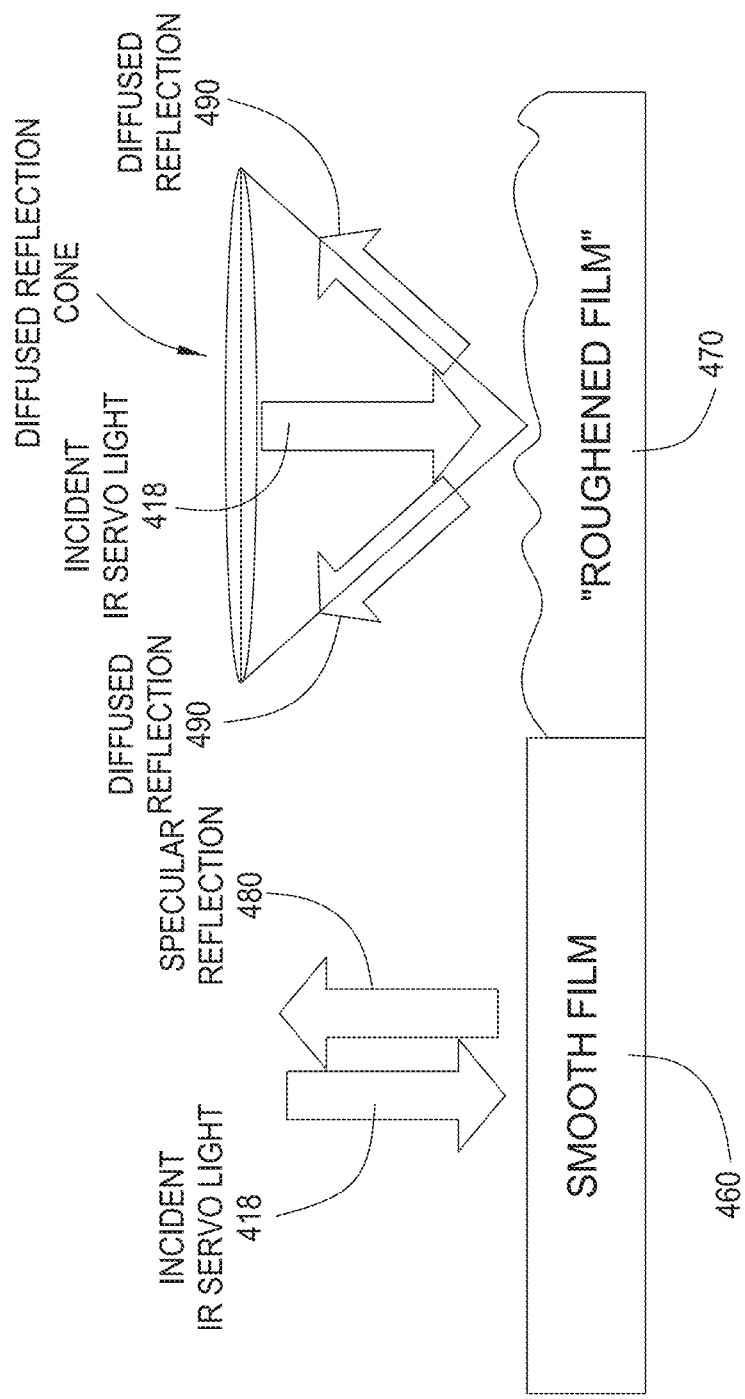
FIG. 4C illustrates an example of one implementation of a screen design having specularly reflective IR feedback marks and diffusively reflective areas outside the IR feedback marks on the screen.

FIG. 4C illustrates an example of one implementation of a screen design having specularly reflective IR feedback marks and diffusively reflective areas outside the IR feedback marks on the screen. FIG. 4C shows a specific implementation of a screen design with specularly reflective IR feedback marks and optically diffusive areas surrounding and between the IR feedback marks. In this implementation, an IR feedback mark is formed by a film stripe that has a smooth surface to produce a specular reflection 480 of the incident IR servo light 418. The screen area between two IR feedback marks is formed by a film layer with a roughened surface that diffuses light in reflecting the incident IR servo light 418 to produce the diffused reflection 490 that spreads in different directions forming a diffused reflection cone. The two regions 460 and 470 have approximately the same optical transmission for light of the excitation beam 420.

The above screen design for IR servo feedback can use the different optical behaviors of the specular reflection and the diffusive reflection of the IR servo beam 418 from the screen in the optical far field from the screen to facilitate the servo detection. Further details of IR servo feedback are described in U.S. Patent Application Publication No. 2014/0071403, which is incorporated by reference herein.

Figure 5:
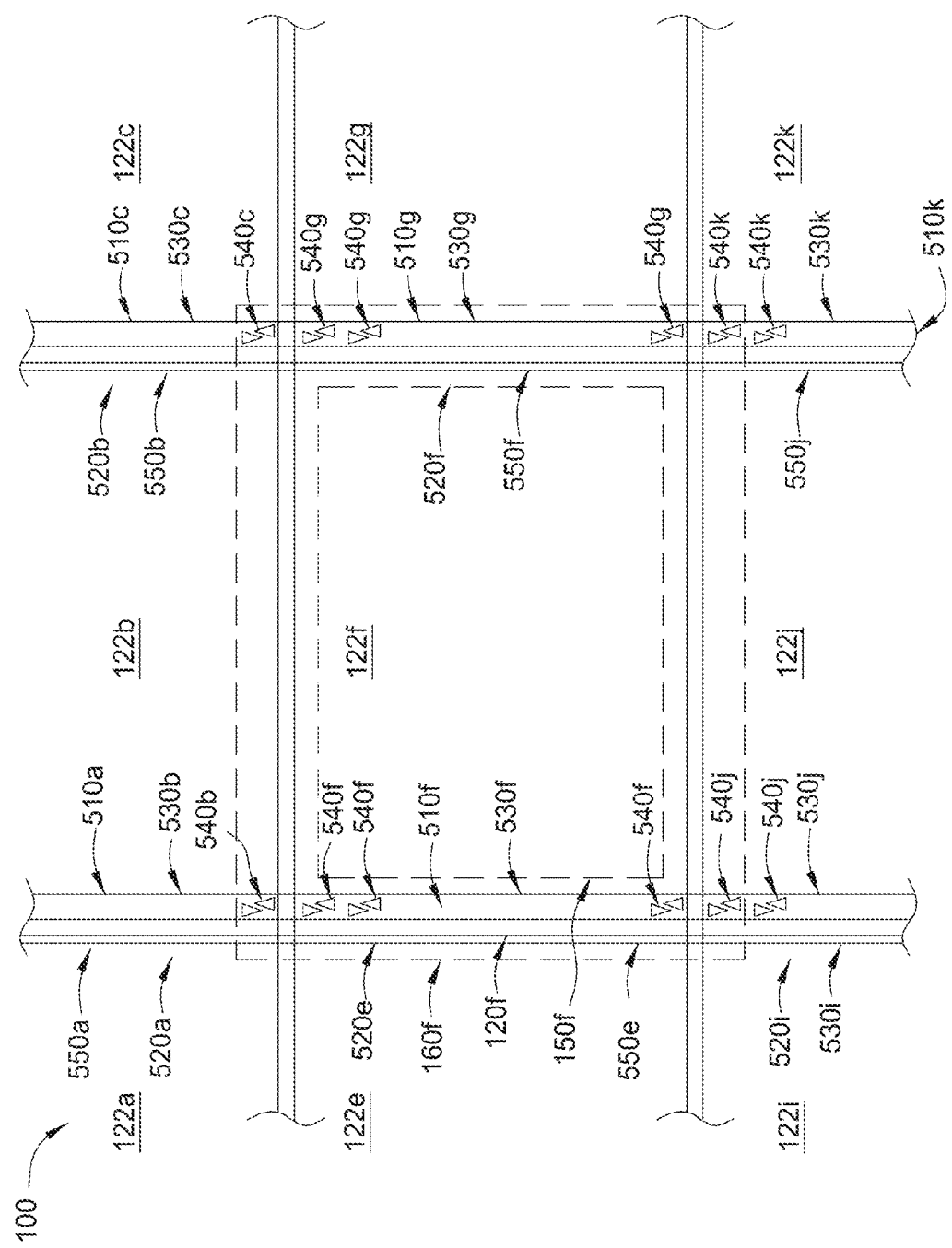
FIG. 5 illustrates a schematic partial view of one implementation of the continuous surface display system of FIG. 1 according to implementations described herein.

FIG. 5 illustrates a schematic partial view of one implementation of the display system 100 of FIG. 1 having peripheral reference mark regions according to implementations described herein. Each display screen region 122a-p may have peripheral reference mark regions. Each screen may include a central active light-emitting display area defined by the inner scanning region 150 with parallel fluorescent stripes (not shown) for displaying images and two stripe peripheral reference mark regions 510a-p (collectively 510) and 520a-p (collectively 520) that are parallel to the fluorescent stripes. Each peripheral reference mark region can be used to provide various reference marks for aligning each light engine module 140a-p with its corresponding display screen region 1220a-p. Notably, because a reference mark in the peripheral reference mark region is outside the active display area of the screen region 122a-p, a corresponding servo feedback control function can be performed outside the duration during the display operation when the excitation beam is scanning through the active fluorescent display area to display an image. Therefore, a dynamic servo operation can be implemented without interfering with the display of the images to the viewer.

Alignment reference marks can be employed to determine the relative position of the beam and the screen and other parameters of the excitation beam on the screen. For example, during a horizontal scan of the excitation and servo beams across the light-emitting stripes, a start of line (SOL) mark can be provided for the system to determine the beginning of the active light-emitting display area of the screen region 122 so that the signal modulation controller of the control system 206 can properly control the timing in delivering optical pulses to targeted pixels. An end of line (EOL) mark can also be provided for the system to determine the end of the active light-emitting display area of the screen region 122 during a horizontal scan. For another example, a vertical alignment reference mark can be provided for the system to determine whether the scanning beams are pointed to a proper vertical location on the display screen region. Other examples for reference marks may be one or more reference marks for measuring the beam spot size on the screen and one or more reference marks on the screen to measure the optical power of the excitation beam 420.

FIG. 5 depicts various reflective marks that may be positioned in the left peripheral reference mark region 510 and/or the right peripheral reference mark region 520 of the display screen region 122. In some implementations, the left peripheral reference mark region 510 may include a start of line (SOL) reference mark 530 and/or vertical reference marks 540. The SOL reference mark 510 can be an optically reflective, diffusive or fluorescent stripe parallel to the fluorescent stripes in the active light-emitting region of the display screen region 122. The SOL reference mark 510 is fixed at a position with a known distance from the first fluorescent stripe in the active light emitting region or inner scanning region 150. SOL patterns may be a single reflective stripe in some implementations and may include multiple vertical lines with uniform or variable spacing in other implementations. Multiple lines are selected for redundancy, increasing the signal to noise ratio, accuracy of position (time) measurement, and providing missing pulse detection.

The vertical reference marks 540 can be placed at different vertical positions, e.g., one vertical reference mark for the servo laser beam 418 to provide vertical position sensing of the servo laser beam 418 in each screen segment. The vertical reference marks of one display screen may be positioned at a fixed distance from the vertical reference marks from the vertical reference marks of an adjacent display screen. For example, the vertical reference marks 540f of display screen region 122f are positioned at a fixed distance from the vertical reference marks 540b of display screen region 122b. The combination of the SOL reference mark 530, the vertical reference marks 540 and the periodic pattern in the strip stricture of the light-emitting area provides positioning information of the invisible servo laser beam 418, positioning information of the excitation laser beams 420 and the horizontal parameters of the pixels on the screen region 122 for servo control in a scanning display system.

Similar to the SOL mark 530, an end-of-line (EOL) reference mark 550 can be implemented on the opposite side of the screen region 122 in the right peripheral reference mark region 520. The EOL reference mark 550 may also be fixed at a position with a know distance from the end of line SOL reference mark of an adjacent display screen. The SOL mark is used to ensure the proper alignment of the laser beam with the beginning of the image area. This does not ensure the proper alignment during the entire horizontal scan because the position errors can be present across the screen. Implementing the EOL reference mark and an end-of-line optical detector in the right peripheral reference mark region 520 can be used to provide a linear, two point correction of laser beam position across the image area. Further details of servo feedback control and the use of markers are described in U.S. Patent Application Publication No. US2010/0097678, U.S. Pat. Nos. 7,878,657 and 7,884,816, all of which are incorporated by reference herein in their entirety.

As depicted in FIG. 5, the outer scanning region 150f of the light engine module 140f associated with display screen region 122f, as currently configured, has the ability to scan and detect the reference marks of adjacent display screen regions 122a, 122b, 122c, 122e, 122g, 122i, 122j, and 122k. For example, the outer scanning region 150f of the light engine module 140f associated with display screen region 122f, as currently configured, has the ability to scan the right peripheral reference mark 520e of display screen region 122e, the left peripheral reference mark 510g of display screen region 122g, portions of the right peripheral reference mark 520a of display screen region 122a, portions of the right peripheral reference mark 520i of display screen region 122i, portions of the left peripheral reference mark 510b and the right peripheral reference mark 520b of display screen region 122b, portions of the left peripheral reference mark 510j and the right peripheral reference mark 520j of display screen region 122j, portions of the left peripheral reference mark 510c of display screen region 122c, and portions of the left peripheral reference mark 510k of display screen region 122j. The reference marks in each individual display screen region 122a-p may me distinguishable from the reference marks in every other individual display screen region thus allowing each light engine module to distinguish the reference marks of one display screen region from the reference marks of another display screen region. In summary each display screen region may have a signature of reference marks to allow the control system 206 to be cognizant of the arrangement of display screen regions.

In some implementations, the reference marks are positioned off-screen, for example, in an off-screen calibration module. Further details of off-screen calibration and off-screen calibration modules are described in U.S. Patent Application Publication No. 2011/0298695, which is incorporated by reference herein.

As depicted in FIG. 5, the outer scanning region 150f of the light engine module 140f associated with display screen region 122f, as currently configured, also has the ability to image portions of the adjacent display screen regions 122a, 122b, 122c, 122e, 122g, 122i, 122j, and 122k. For example, the outer scanning region 150f of the light engine module 140f associated with display screen region 122f, as currently configured, has the ability to scan portions of display screen region 122b and portions of display screen region 122j. Thus the overscanning capability allows a particular light engine module to image not only its corresponding display screen region but the light engine module can also image portions of adjacent display screen regions.

Figure 6:
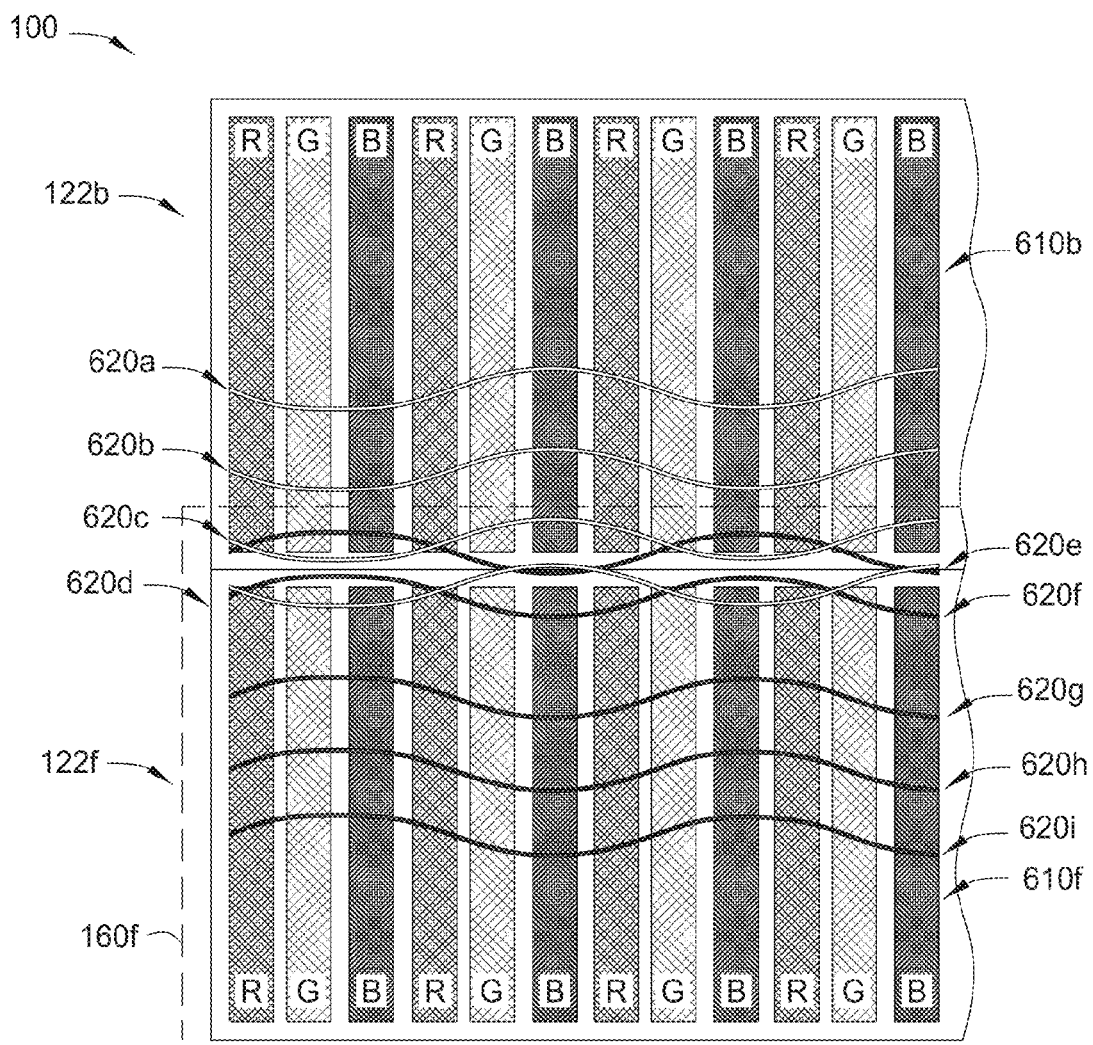
FIG. 6 illustrates a schematic partial view of one implementation of the continuous surface display system of FIG. 5 according to implementations described herein.

FIG. 6 illustrates a schematic partial view of one implementation of the continuous surface display system 100 of FIG. 5 according to implementations described herein. FIG. 6 depicts display screen region 122f positioned below display screen region 122b. Each display screen region 122b, 122f has a plurality of phosphor stripes 610b and 610f respectively. The phosphor stripes 610b, 610f are made up of alternating phosphor stripes of different colors, e.g., red (R), green (G), and blue (B), where the colors are selected so that they can be combined to form white light and other colors of light. The travel paths 620a, 620b, 620c, 620d of the beam of the excitation laser 406 associated with light engine module 140b that corresponds with the display screen region 122b are depicted. The travel paths 620e, 620f, 620g, 620h, 620i of the beam of the excitation laser 406 associated with light engine module 140f that corresponds with the display screen region 122f are also depicted.

As depicted in FIG. 6, the beam travel path 620f nearest the top of display screen region 122f shows that the excitation beam of light engine 140f fails to excite the phosphor stripes 610f in certain areas or subpixels. However by using the overscanning capability of the excitation beam of light engine 140b, the excitation beam of light engine 140b, as shown by travel path 620d, is able to excite the portions of the phosphor stripes 610f that the excitation beam of light engine 140f fails to excite.

Similarly, the beam travel path of 620c positioned toward the bottom of display screen region 122b shows that that excitation beam of light engine module 140b fails to excite the phosphor stripes 610b in certain regions or subpixels. However by using the overscanning capability of the excitation beam of light engine 140f, the excitation beam of light engine 140f, as shown by travel path 620e, is able to excite the portions of the phosphor stripes 610b that the excitation beam of light engine 140b fails to excite. Thus the overscanning capability allows a particular light engine module to image not only subpixels in its corresponding display screen region but the light engine module can also image subpixels of adjacent display screen regions.

Figure 7:
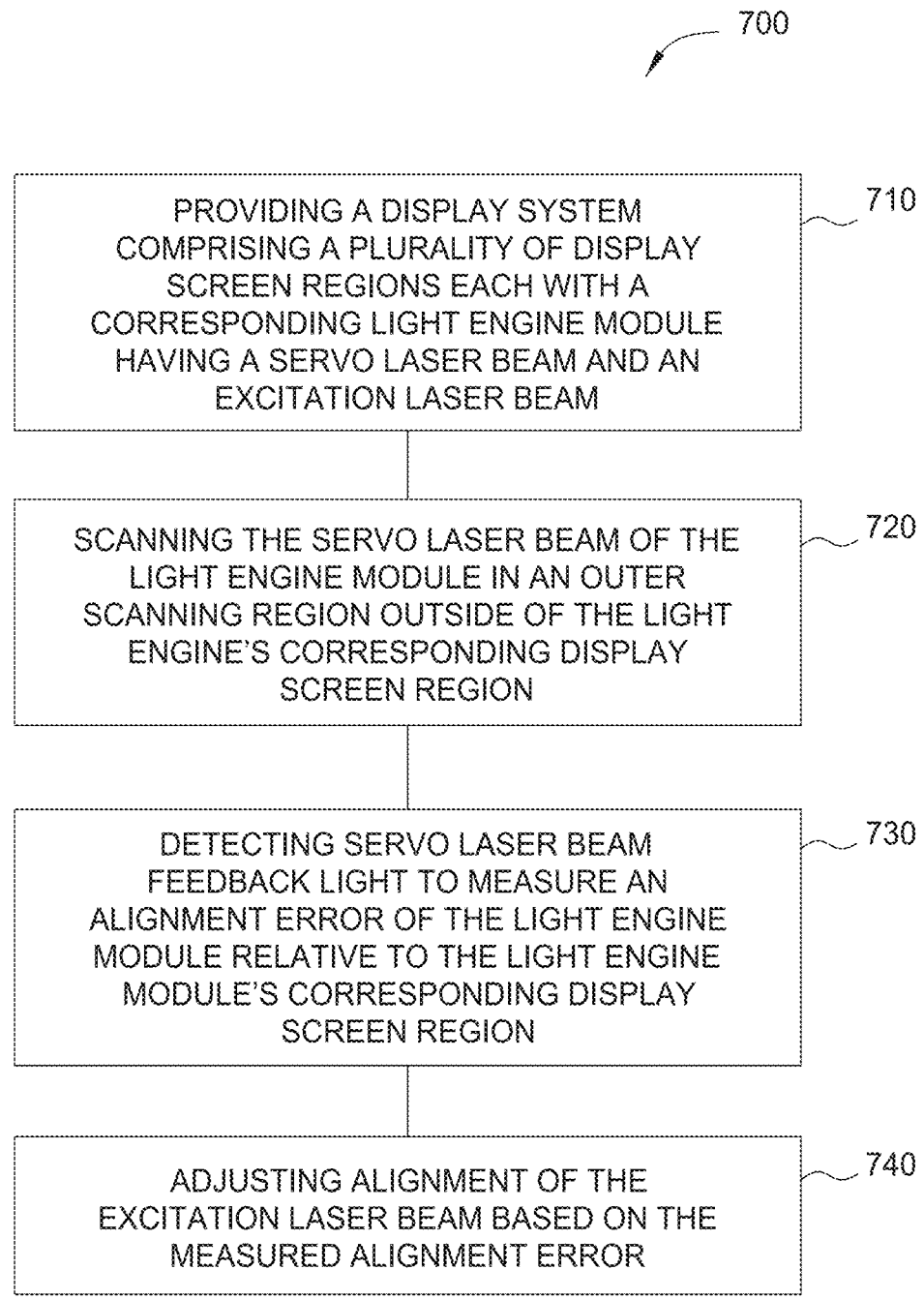
FIG. 7 is a flow diagram of a method for aligning display screen modules with their corresponding light engine modules according to an implementation described herein.

FIG. 7 is a flow diagram of a method 700 for aligning image emission modules with their corresponding light engine modules according to implementations described herein. The method 700 begins at block 710 where a display system comprising a display screen having a plurality of display screen regions each with one or more corresponding light engine modules having a servo laser beam and an excitation laser beam is provided. The display system may be similar to the display systems described herein. In certain implementations, each light engine module and corresponding display screen region are combined in a single module. In certain implementations, the light engine modules are separate or detached from the display screen or display screen regions. For example, the light engine modules may be positioned in a rack that is separate or detached from a sheet containing the display screen regions. The display system typically contains display screen regions which are misaligned relative to their corresponding light engine modules.

At block 720, the servo laser beam of the light engine module is scanned in an outer scanning region located outside of the light engine module's corresponding display screen region. As previously described herein, overscanning of the servo laser beam may be used to detect the reflective markings (e.g. SOL, scribe lines, EOL, and vertical reflective markings) of adjacent display screen regions.

At block 730, servo laser beam feedback light is detected to measure an alignment error of the light engine module relative to the light engine module's corresponding display screen region. The servo laser beam feedback light typically contains light reflected from the reflective markings.

At block 740, alignment of the excitation laser beam is adjusted based on the measured alignment error. Adjustment of the excitation laser beam may involve shifting vertically by an adjustment of the galvo mirror or shifting horizontally, by adjusting the timing of the pulse on/off conjunction with the known position of the beam as the polygon scans. Each of these characteristics can be adjusted independently in order to ensure the coherency and quality of the image using a different servo-mechanism. For example, the activation timing of the excitation lasers 406 may be adjusted via a retiming servo-mechanism; the vertical position of each prism 408 may be adjusted via a stepper motor; and the angle 415 of the galvo mirror 414 may be adjusted via a galvanometer servo-mechanism. Those skilled in the art will recognize that the characteristics described above may also be adjusted using any other technically feasible electromechanical or electro-optical system under the control of the control system 206. In one implementation, the adjustment of the activation timings of the excitation lasers 406 is carried out before or after each scan across the scan surface 216, and the vertical position of each prism 408 is adjusted less frequently. The frequency in the adjustments of the vertical position of each prism 408 may, however, be increased by employing a stepper motor with faster response times.

Figure 8:
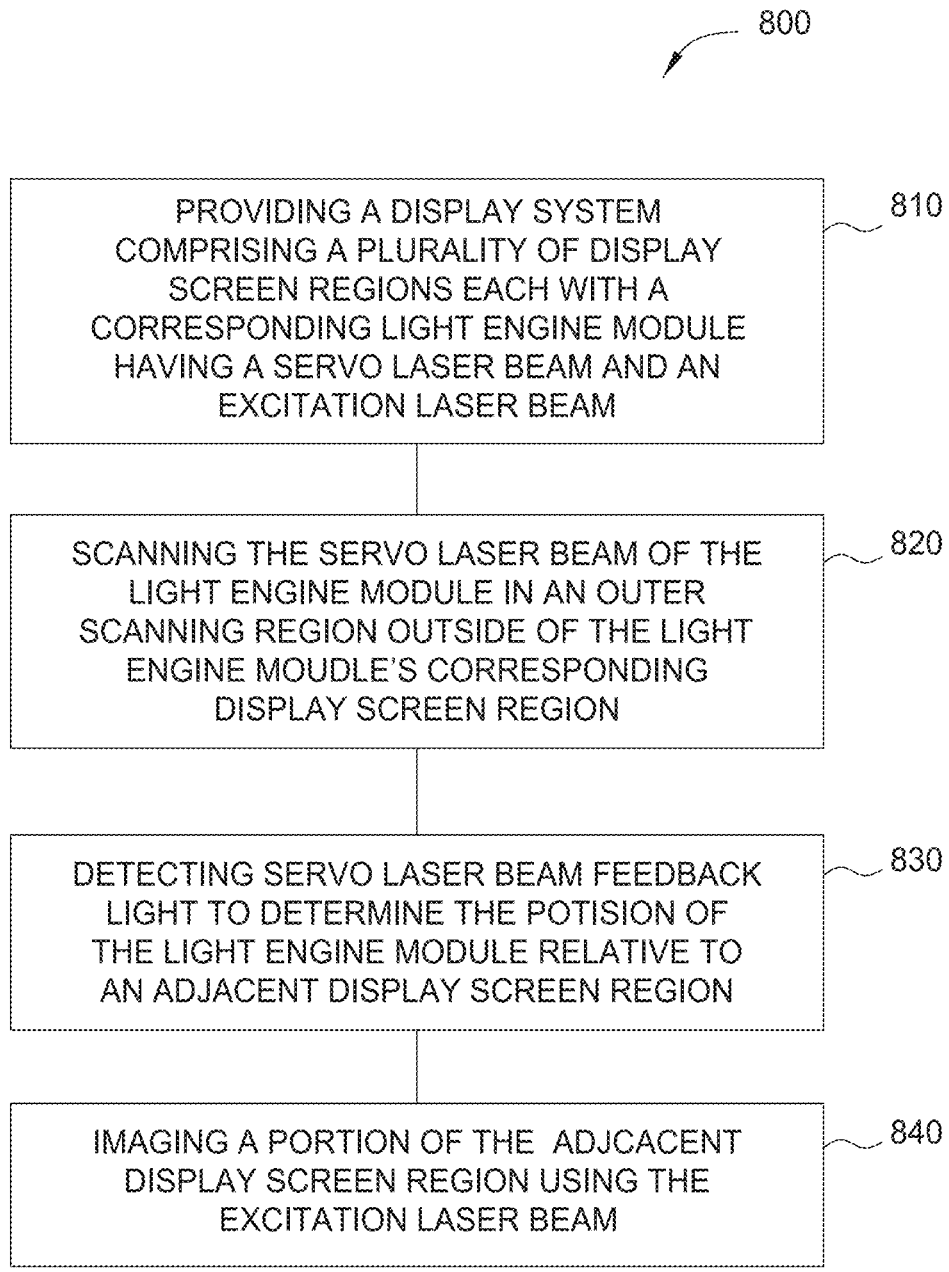
FIG. 8 is a flow diagram of another method for aligning display screen modules with their corresponding light engine modules according to an implementation described herein.

FIG. 8 is a flow diagram of another method 800 for aligning display screen regions with their corresponding light engine modules according to an implementation described herein. The method 800 begins at block 810 where a display system comprising a display screen having a plurality of display screen regions each with a corresponding light engine module having a servo laser beam and an excitation laser beam configured to provide a common image is provided. The display system may be similar to the display systems described herein. In certain implementations, each light engine module and corresponding display screen region are combined in a single module. In certain implementations, the light engine modules are separate or detached from the display screen or display screen regions. For example, the light engine modules may be positioned in a rack that is separate or detached from a sheet containing the display screen regions. The display system typically contains display screen regions which are misaligned relative to their corresponding light engine modules.

At block 820, the servo laser beam and the excitation laser beam of the light engine module are scanned in an outer scanning regions located outside of the light engine module's corresponding display screen region. As previously described herein, overscanning of the servo laser beam may be used to detect the reflective markings (e.g. SOL, scribe lines, EOL, and vertical reflective markings) of adjacent display screen regions.

At block 830, servo laser beam feedback light is detected to determine the position of the light engine module relative to an adjacent display screen region. The servo laser beam feedback light typically contains light reflected from the reflective markings.

At block 840, at least a portion of the adjacent display screen region is imaged using the excitation laser beam.

Figure 9:
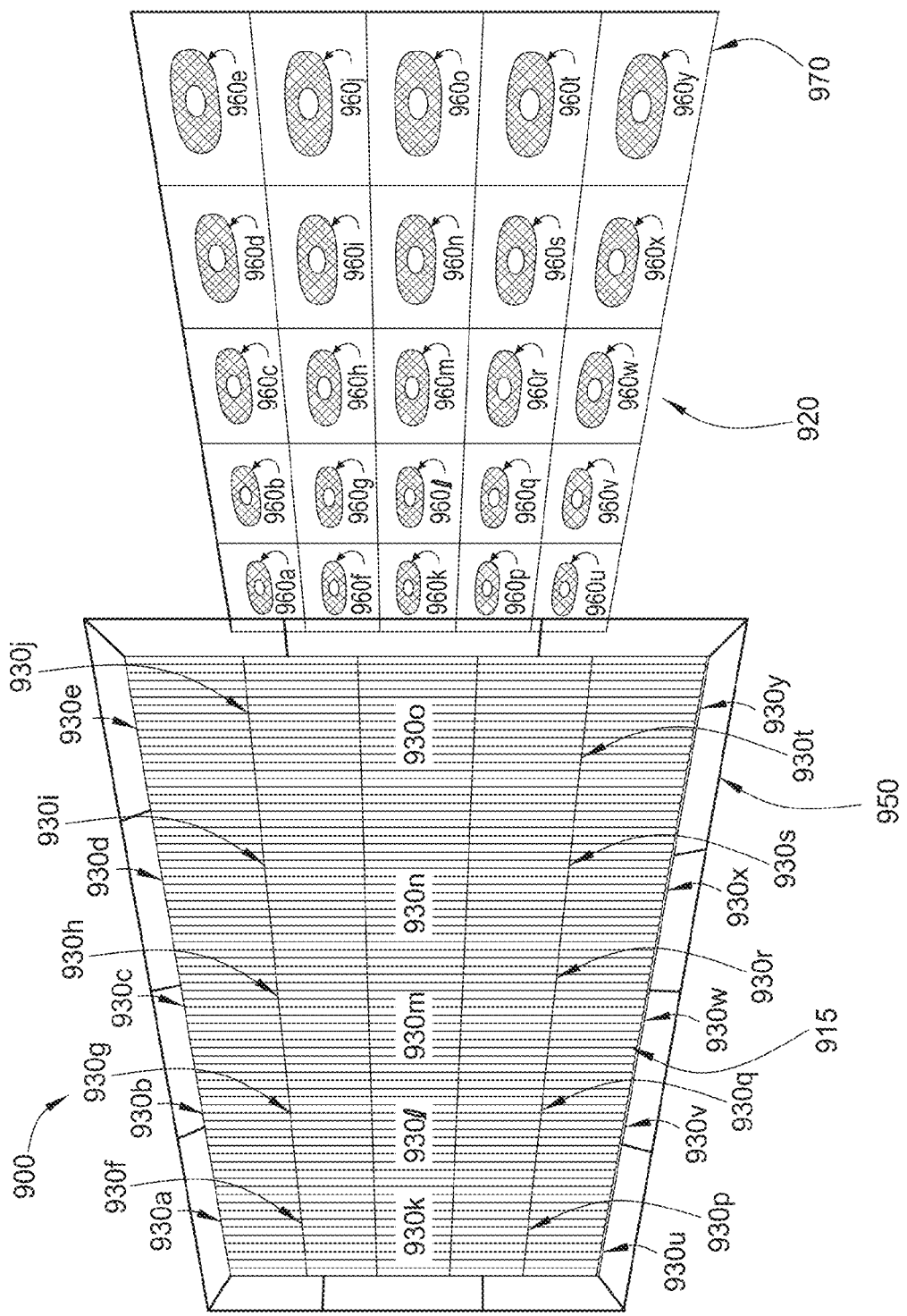
FIG. 9 illustrates a schematic view of another implementation of a continuous surface display system according to implementations described herein.

FIG. 9 illustrates a schematic view of another implementation of a continuous surface display system 900 according to implementations described herein. The display system 900 is similar to the display system 100 depicted in FIG. 1. The display system 900 comprises a display screen 915 and an array of light engine modules 920. The display screen 915 may comprise phosphor regions (See FIG. 6) that may be phosphor stripes, phosphor dots or other arrangements of the phosphors. The display screen 915 comprises a plurality of display screen regions 930a-930p. In some implementations, the display screen regions 930a-930p are defined regions of a continuous sheet or sheets. In some implementations, the display screen regions 930a-930p comprise a plurality of separate display screen modules or "tilettes" that are placed adjacent to each other to form the display screen 915 having a continuous uniform surface. The display screen 915 can be manufactured in transportable sizes and rolled for easy transport to the final install location.

The display screen 915 and the array of light engine modules 920 are physically separable from each other. The display screen 915 is coupled with a display screen support frame 950 for supporting the display screen 915. The support frame 950 may be transparent to visible light.

The array of light engine modules 920 comprises a plurality of light engine modules 960a-y. Each light engine module 960a-y is positioned in a stand-alone support rack 970. The stand-alone support rack 970 may be transparent to visible light. The stand-alone support rack 970 may be coupled with the support frame 950 using methods know to those of skill in the art. Each light engine module 960a-y may correspond to a specific display screen region 940a-y. For example, light engine module 960a may correspond to display screen region 930a. It should be noted that although twenty display screen regions 930a-y and twenty light engine modules 960a-y are depicted in FIG. 9, any plurality of display screen region may be used with the implementations described herein.

Figure 10:
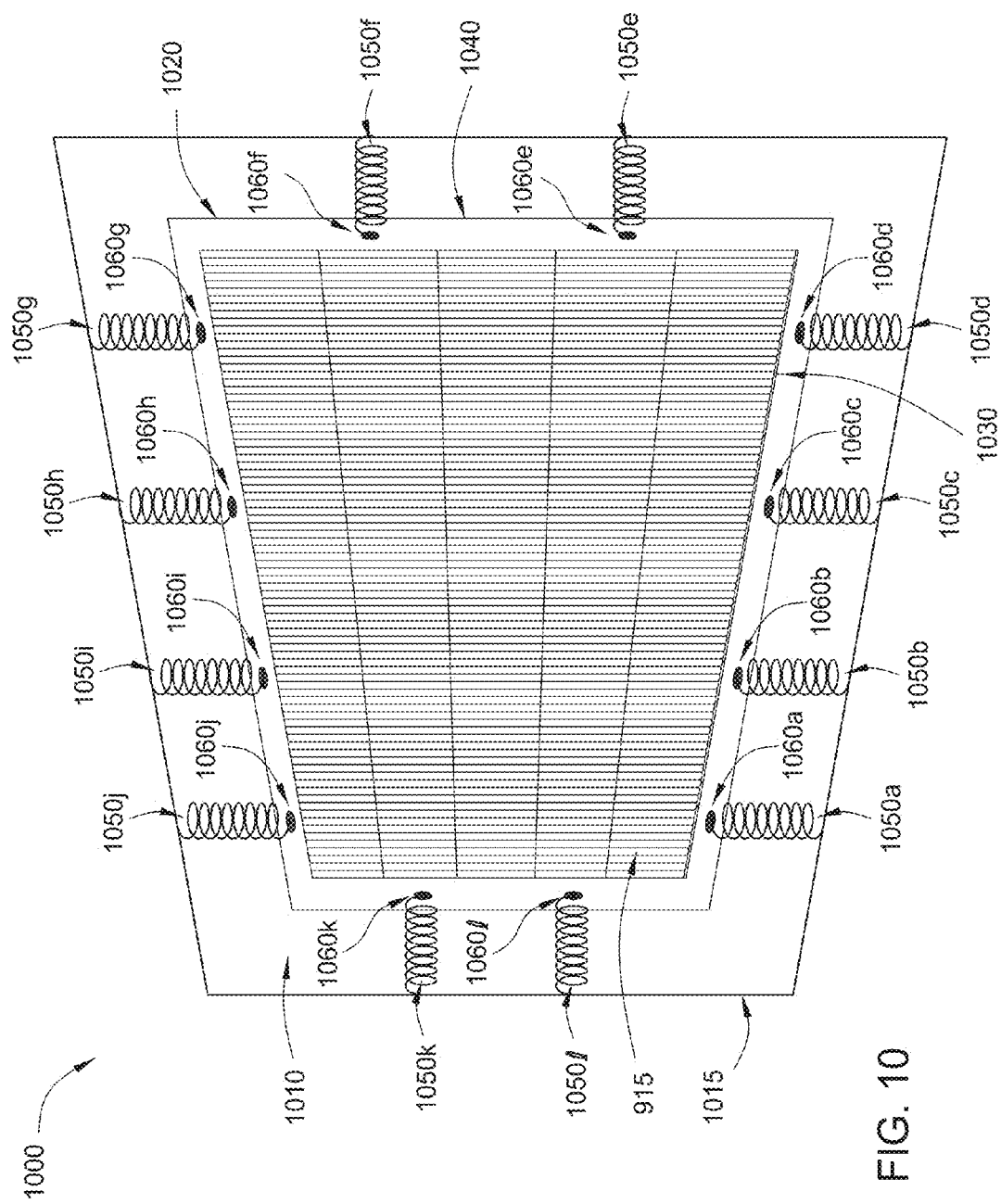
FIG. 10 illustrates a schematic view of one implementation of a display screen assembly according to implementations described herein.

FIG. 10 illustrates a schematic view of one implementation of a display screen assembly 1000 according to implementations described herein. The display screen assembly 1000 includes a free-hanging display screen 1010 coupled with a support frame 1015. The free-hanging display screen 1010 may comprise phosphor regions (See FIG. 6) that may be phosphor stripes, phosphor dots or other arrangements of the phosphors. Similar to display screen 915, the display screen 1010 comprises a plurality of display screen regions. In some implementations, the display screen regions are defined regions of a continuous sheet or sheets. In some implementations, the display screen regions comprise a plurality of separate display screen modules or "tilettes" that are placed adjacent to each other to form the display screen 1010 having a continuous uniform surface.

In implementations where tilettes are used, each tilette may be embedded in the free-hanging screen 1010. The free-hanging screen may comprise a sheet or multiple sheets 1020. The sheets 1020 are transparent to visible light. In implementations where multiple sheets are used, a first visible light transparent sheet and a second visible light transparent sheet may be positioned on opposite sides of the image emission modules of the array of tilettes holding the array of tilettes together between the two sheets. The sheets 1020 may comprise sheets that are of a relatively stiff, yet bendable material. The sheets 1020 may be bolted together, bonded together, clamped together and/or held together using a slight pressure from the sides which may cause the sheets to bow.

The sheets 1020 may comprise any material having suitable optical clarity, rigidity, toughness, and UV yellowing resistance. The material should also have the suitable stiffness, creep resistance (i.e. slow deformation under constant load), CTE, low anisotropy, and low coefficient of humidity expansion. In some implementations, the sheets 1020 comprise acrylic sheets, e.g., Plexiglas. In some implementations, the sheets 1020 comprise materials selected from polyethylene terephthalate (PET), polyethylene naphthalate (PEN), polyolefins, polyamide, poly(oxymethylene) (POM), poly(methyl methacrylate) (PMMA), polycarbonate and combinations thereof. In implementations where multiple sheets are used, the sheets 1020 may each have a thickness independently selected from about 1.0 millimeter to about 6.0 millimeters. In some implementations where multiple sheets are used, a first sheet of the sheets 1020 may each have a thickness from about 1.5 millimeters to about 3.0 millimeters and a second sheet of the sheets 1020 may have a thickness from about 4.5 millimeters to about 6.0 millimeters. In some implementations the sheet may be of materials or configurations contributing to tilette imaging.

As depicted in FIG. 10, the sheets 1020 may be larger in length and width than the array of tilettes though in another implementation, the tilettes may comprise the size of the sheets. Thus the sheets 1020 have an imaging portion 1030 where the array of tilettes may be positioned and a non-imaging portion 1040 extending from the imaging portion 1030, which may or may not include portions of the tilettes. In some implementations, the non-imaging portion 1040 may either be thicker or have pressure distributing material extended over the non-imaging area.

The material of the non-imaging portion 1040 is selected such that the material allows for the free-hanging screen 1010 to be under mostly uniform tension. The material of the non-imaging portion 1040 may either be merely an extension of the material of the imaging portion 1030, a thicker portion of the material of the imaging portion 1030 or may have some additional material that helps distribute the tension pressure (e.g., a bar, another plyable material, etc.).

The free-hanging screen 1010 may be coupled with the support frame 1015. The free-hanging screen 1010 may be coupled with the support frame 1015 via an attachment member or plurality of attachment members 1050a-l. The attachment members 1050a-l are selected such that a desired tension is maintained between the free-hanging screen 1010 and the support frame 1015. In one implementation, the attachment members are a set of spring tensioners that have a tension based on the weight and size of the free-hanging screen under tension. Although twelve attachment members are depicted in FIG. 10, it should be understood that any number of attachment members may be used depending upon the weight and size of the free-hanging screen 1010 to be under tension. The number of attachment members may vary as well depending upon the weight, size, and needed uniform tautness of and across the screen. The attachment members 1050a-l may be coupled with the non-imaging portion 1040 of the sheets 1020 via a connecting member 1060a-l, such as a grommet. Further details of a tiled display system are described in International Application No.: PCT/

US13/63139, filed Oct. 3, 2013 and titled Seamless Emission Tile Quilt, which is incorporated by reference herein in its entirety.

In some implementations where a display screen and an array of light engine modules are physically separable from each other, such as display system 900, it may be difficult to maintain uniform spacing between the display screen and the array of light engine modules. For example, the display screen may move back and forth relative to the light engine modules. Further, the light engine module also has some tolerance in the manner of alignment with the display screen. Therefore, there is a need for cost-effective alignment techniques for display screen systems that dynamically compensate for misalignment of the display screen system relative to light engine modules.

In some implementations, a z-position sensor is added to the display system to detect movement of the display screen relative to the light engine modules. The z-position sensor may be any z-position sensor known to those skilled in the art. Exemplary z-position sensors include but are not limited to beam sensors and ultrasonic sensors. In some implementations that use beam sensors, a laser beam is sent to the display panel and the reflection of the beam is detected by a liner CMOS, CCD array or a linear PSD. The beam position at the array is proportional to the z-displacement. In some implementations where an ultrasonic sensor is used, the time-of-flight of the acoustic reflection of an ultrasonic signal aimed at the display panel. The acoustic signal could be digitally encoded to avoid interference by external equipment.

The z-position sensor may be positioned in any area of the display system sufficient to monitor movement of the display screen. One exemplary position for the z-position sensor is in the light engine module 140. The z-position sensor may be positioned separate from the display system sufficient to monitor movement of the display screen.

After the z-position sensor senses that there is deflection, the deflection information from the z-position sensor is then used to determine what kind of correction is needed. If the deflection is −2 then the adjustment parameters that correspond to a −2 deflection are used. Generally, there is a one to one correspondence between the deflection information and the number of horizontal lines that overlap. Thus, the deflection information is used to determine the number of overlapping lines that are present. Based on the number of overlapping lines, the correction of parameters such as intensity can be determined. The corrections are typically based on known information and the deflection information. Since there is a one to one correspondence between deflections and overlap, once the deflection information is known, the number of overlapping lines can be calculated and the parameters required to correct for the given overlap can be determined and applied to the system. Parameters may include adjusting intensity or brightness. For example, if two lines physically overlap—then the intensity of each of the two overlapping lines would be adjusted to 50:50 rather than 100% which would be brighter.

Figure 11:
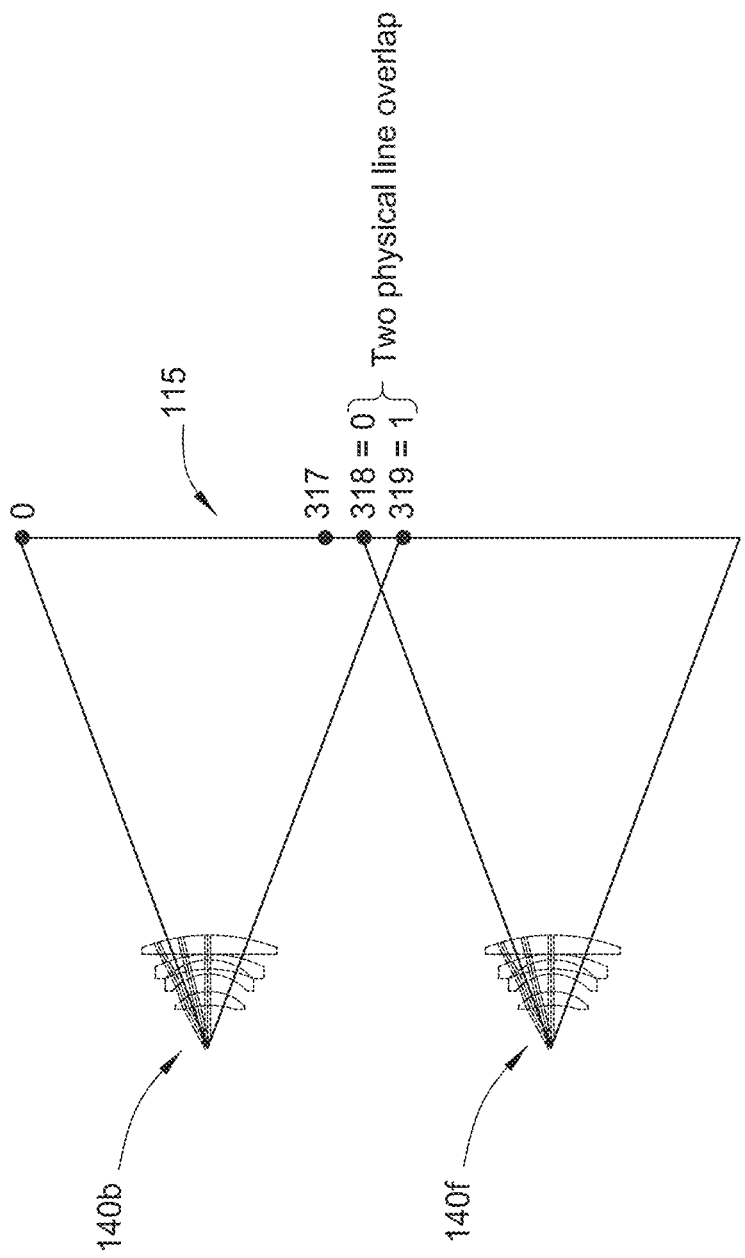
FIG. 11 illustrates a schematic view of physical line overlap to accommodate panel z deflection according to implementations described herein.

FIG. 11 illustrates a schematic view of physical line overlap to accommodate panel z deflection according to implementations described herein. FIG. 11 shows the side view of two vertically stacked light engine modules 140b, 140f represented by their respective scan lenses and the scanning beam region for each of the two light engine modules in relation to display screen 115. As depicted in FIG. 11, the scanning beams physically overlap. In the exemplary implementation depicted in FIG. 11, each light engine module 140b, 140f will scan 320 lines. The lines are numbered on the display screen 115 from 0 to 319 for the top and from 0 to 319 for the bottom. In the nominal position, line 318 of the top unit overlaps with line 0 of the bottom unit and line 319 of the top unit overlaps with line 1 of the bottom unit. The physical overlap helps accommodate for tolerance because it is difficult to maintain the display screen in a position that maintains uniform spacing relative to the light engine modules. The display screen may move back and forth and the light engine module has some tolerance in the manner that it is aligned with the display screen so physical overlap of the images helps accommodate for these deficiencies. If the panel moves back and forth and left to right the physical overlap can still be maintained to a certain degree.

Figure 12:
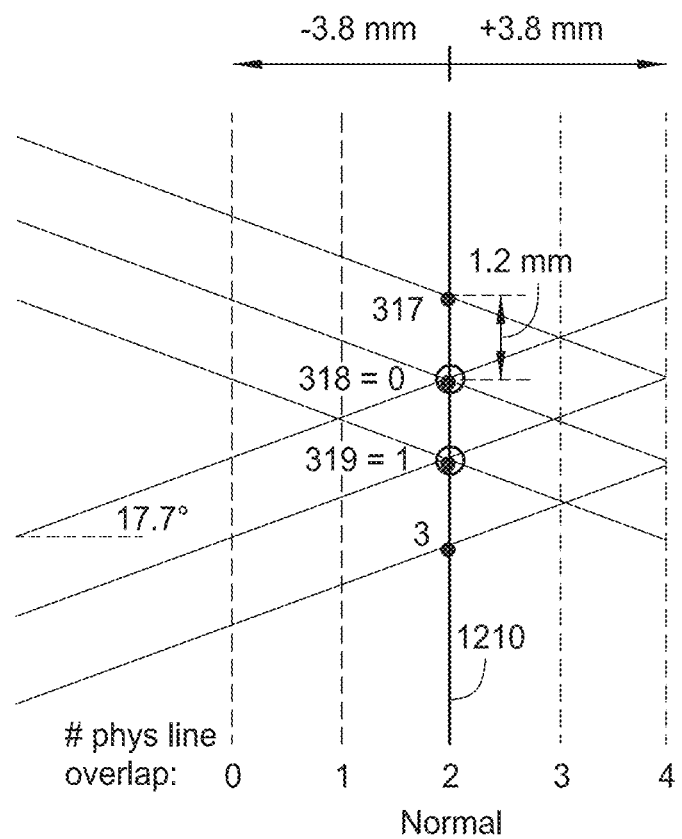
FIG. 12 illustrates another schematic view of physical line overlap to accommodate panel z-deflection according to implementations described herein.

FIG. 12 illustrates another schematic view of physical line overlap to accommodate panel z-deflection according to implementations described herein. The nominal position is represented by the line 1210 with two physical line overlaps. The circles represent the center of the lines 317, 318 and 319. There is no overlap for line 317 of the top panel in the nominal position but lines 318 and 319 physically overlap with lines zero and one respectively from the lower panel.

TABLE I

| Z Deflection (mm) | # Phys Line Overlaps | Effective #Lines/LE | Pixel Aspect | Pix Pitch (mm) |
| --- | --- | --- | --- | --- |
| −3.8 | 0 | 320 | 424:320 | 1.192 |
| −1.9 | 1 | 319 | 424:319 | 1.196 |
| 0 | 2 | 318 | 424:318 | 1.200 |
| +1.9 | 3 | 317 | 424:317 | 1.204 |
| +3.8 | 4 | 316 | 424:316 | 1.208 |

Table I shows the number of physical line overlaps related to a specific deflection value. At a deflection of −3.8 there is no overlap—the spacing between 319 from the top and 0 from the bottom is exactly a pitch so there is no gap. As the z value becomes more negative, a gap is opened. As the z value becomes more positive, there will be more of a physical line overlap. For example, for a deflection of zero, two lines overlap and number of lines overlapping increases as you go into +Z.

TABLE II

| Z deflection (mm) | # Phys Line Overlap | # Image Line Overlap | Effective #Lines/LE | Pixel Aspect | Pix Pitch (mm) | Y Mapping |
| --- | --- | --- | --- | --- | --- | --- |
| −3.8 | 0 | −2 | 320 | 424:320 | 1.193 | 318 to 320 |
| −1.9 | 1 | −1 | 319 | 424:319 | 1.196 | 318 to 319 |
| 0 | 2 | 0 | 318 | 424:318 | 1.200 | 318 to 318 |
| +1.9 | 3 | 1 | 317 | 424:317 | 1.204 | 318 to 317 |
| +3.8 | 4 | 2 | 316 | 424:316 | 1.208 | 318 to 316 |

Table II is similar to Table I; however Table II includes a column showing the number of image line overlap. The image line overlap may be corrected in response to the physical line overlap. It is desirable to display an image without either extra lines or a reduced number of lines. As an example, in order to map an image exactly on the available lines with two physical line overlaps at 318 and 319 and 0 and 1 the intensity is adjusted to be about 50:50. Without correction, the overlap would appear as two bright lights.

In certain implementations, the vertical pixels are mapped to the display pixel. If the panel moves back and forth then the available lines goes down/up and down/up. With reference to the last column of Table II, in the z-position you have 318 image lines and need to map the 318 physical lines of display but as z moves back and forth there are 319 lines that need to be mapped to 320, 319, 318, etc. which can be accomplished by interpolating 320 to 318 but the interpolation requires a great deal of processing power.

In certain implementations, the image is interpolated in the overlap area only. For example, from lines 0 to 315 it's basically the same but in the area of 316 and 319 and 0 to 4 interpolation is needed. However by interpolating only in the overlap region rather than the full display, you only have to deal with a few number of lines instead of the full display. In some implementations, the z-detection may be used in real-time to detect the z position or the z-distance from the nominal. The real-time z-detection information can be used to correct the image in real time.

Figure 13:
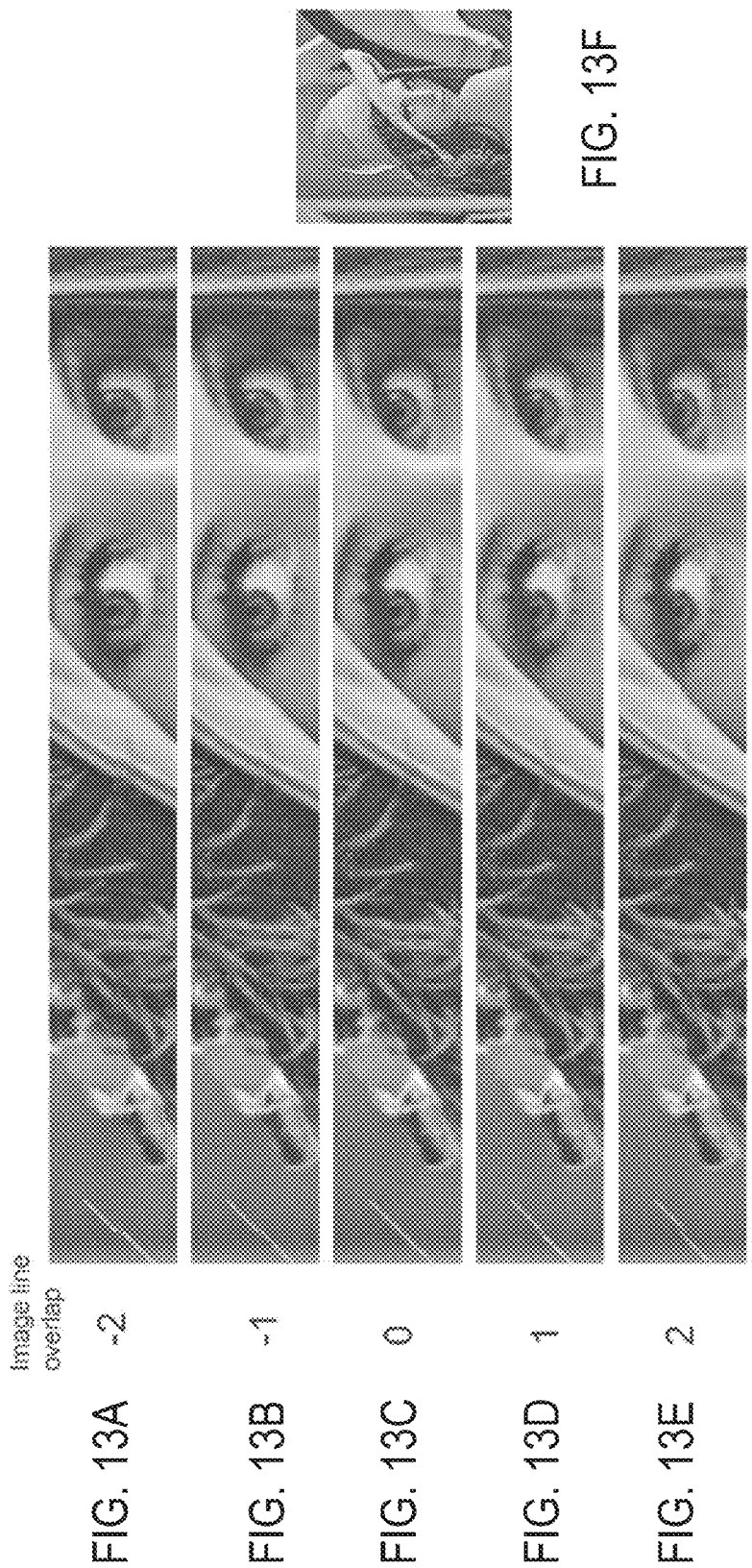
FIGS. 13A-13E illustrate portions of the natural image of FIG. 13F with the image line overlap depicted on the left side of each image.
FIG. 13F illustrates the natural image.

FIGS. 13A-13E illustrate portions of the natural image of FIG. 13F with the image line overlap depicted on the left side of each image. FIG. 13F illustrates the natural image. The 45 degree line on the left of each of FIGS. 13A-13E illustrates the deficiency in lines. FIG. 13A illustrates a portion of the natural image of FIG. 13F with an image line overlap of −2. FIG. 13B illustrates the same portion of the natural image of FIG. 13F with an image line overlap of −1. FIG. 13C illustrates the same portion of the natural image of FIG. 13F with no image line overlap. FIG. 13D illustrates the same portion of the natural image of FIG. 13F with an image line overlap of +1. FIG. 13D illustrates the same portion of the natural image of FIG. 13F with an image line overlap of +2.

Figure 14:
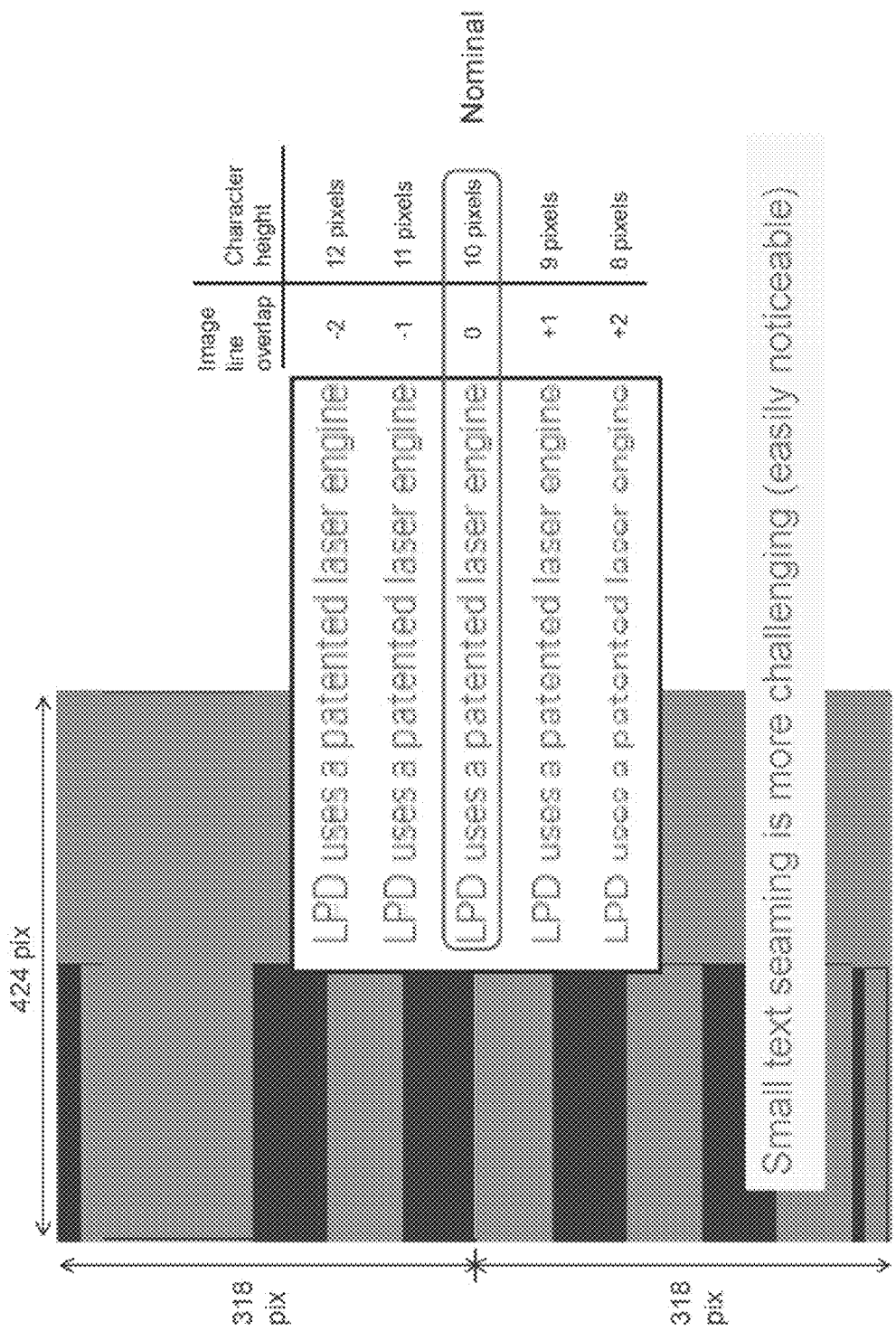
FIG. 14 illustrates text image overlap.

FIG. 14 illustrates text image overlap. As depicted for image line overlap of −2, −1, +1 and +2 small text seaming is more challenging.

Figures 15A, 15B:
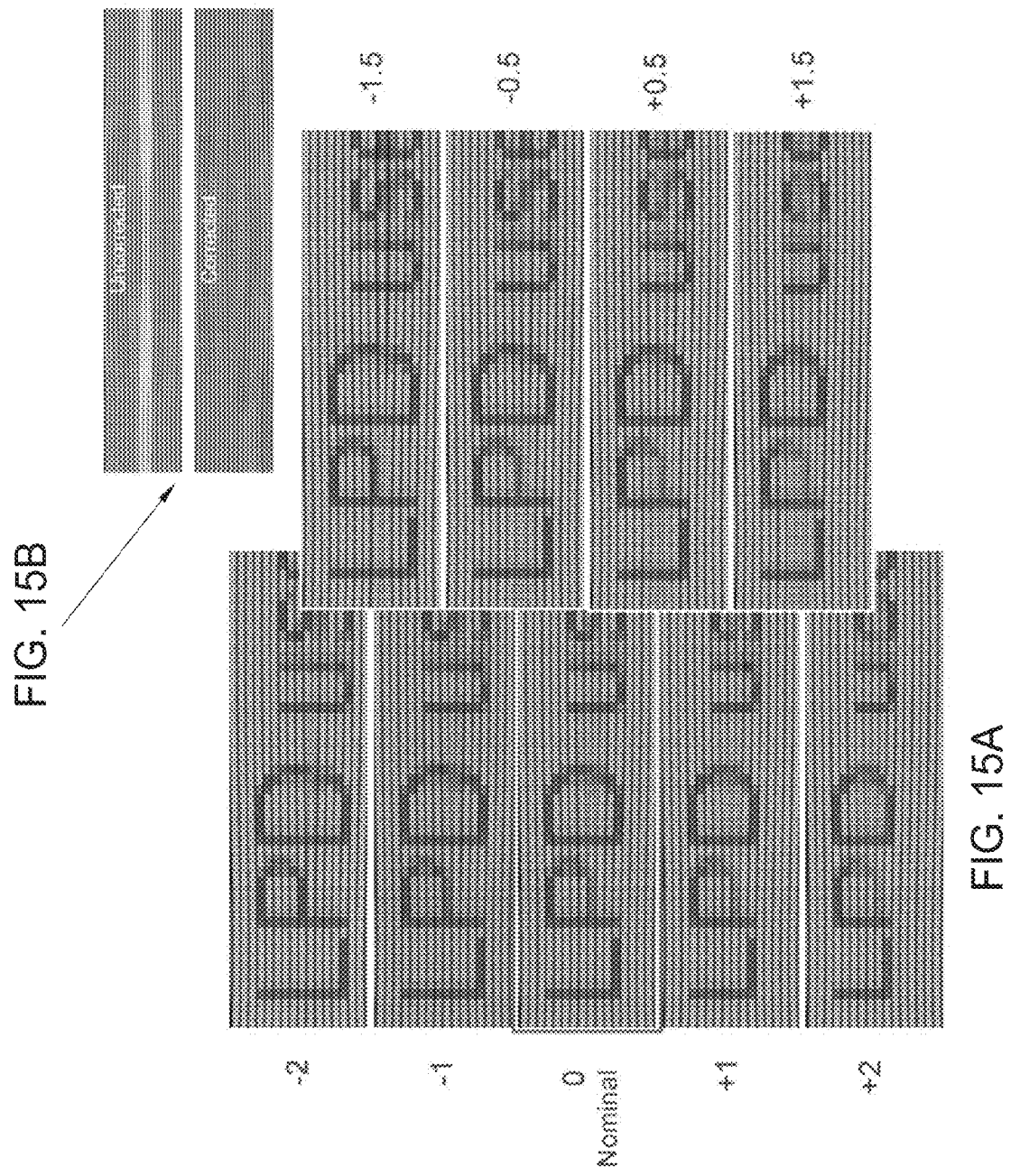
FIGS. 15A-15B illustrate the detail in text image overlap using LPD techniques.

FIGS. 15A-15B illustrate the detail in text image overlap using LPD techniques.

FIG. 16A illustrates an image that is uncorrected for image overlap. FIG. 16B illustrates a version of the image of FIG. 16A corrected for image overlap according to implementations described herein.

FIG. 17A illustrates an image that is uncorrected for image overlap. FIG. 17B illustrates a version of the image of FIG. 17A that has been corrected for image overlap according to implementations described herein.

FIG. 18A illustrates an image that is uncorrected for image overlap. FIG. 18B illustrates a version of the image of FIG. 18A that has been corrected for image overlap according to implementations described herein.

FIG. 19A illustrates an image that is uncorrected for image overlap. FIG. 19B illustrates a version of the image of FIG. 19A that has been corrected for image overlap according to implementations described herein.

FIG. 20A illustrates an image that is uncorrected for image overlap. FIG. 20B illustrates a version of the image of FIG. 19A that has been corrected for image overlap according to implementations described herein.

While the foregoing is directed to implementations of the present invention, other and further implementations of the invention may be devised without departing from the basic scope thereof, and the scope thereof is determined by the claims that follow.

The invention claimed is:

1. A scanning beam display system, comprising:
   a continuous surface display screen comprising:
      a plurality of layers; and
      a plurality of reference marks disposed on at least one of the layers;
   a first light engine module for conveying first image information by directing and emitting spatially controlled instances of excitation light in a first given area of the continuous surface display screen corresponding to the first light engine module;
   a first servo system for determining placement of the emitted spatially controlled instances of excitation light in the first given area of the continuous surface display screen, wherein at least one reference mark of the plurality of reference marks is used to determine placement of the emitted excitation light in the first given area;
   a second light engine module for conveying second image information by directing and emitting spatially controlled instances of excitation light in a second given area of the continuous surface display screen corresponding to the second light engine module; and
   a second servo system for determining placement of the emitted spatially controlled instances of excitation light in the second given area of the continuous surface display screen, wherein at least one reference mark of the plurality of reference marks is used to determine placement of the emitted excitation light in the second given area;
   a control unit operable to:
      provide feedback signals to the first or second servo system;
      access one or more alignment tables containing data representing physical parameters associated with the continuous surface display screen;
      determine the correspondence between the determined placement of the emitted spatially controlled instances of excitation light in the first given area of the display screen and the determined placement of the emitted spatially controlled instances of excitation light in the second given area of the display screen;
      instruct the first light engine module to convey an image first sub-image in the first given area of the display screen based on the feedback signals received by the servo systems, data contained in the alignment tables, and the determined correspondence between the determined placement of the emitted spatially controlled instances of excitation light in the first and second given areas of the display screen; and
      instruct the second light engine module to convey the image second sub-image in the second given area of the display screen based on the feedback signals received by the servo systems, data contained in the alignment tables, and the determined correspondence between the determined placement of the emitted spatially controlled instances of excitation light in the first and second given areas of the display screen.

2. The system of claim 1, wherein the first image information is rendered as a first pixel array and the second image information is rendered as a second pixel array.

3. The system of claim 2, wherein the first pixel array and the second pixel array share common image information on one or more lines of pixels.

4. The system of claim 1, wherein each servo system detects and relays spatial placement of specific light on a specific location of the continuous surface display screen.

5. The system of claim 4, wherein each of the first servo system and the second servo system comprise:
   a servo light source to produce at least one servo beam at a servo beam wavelength that is different from the excitation light wavelength; and a servo detector positioned to receive reflected light of the servo beam and to produce a monitor signal indicative of positioning of the servo beam on the continuous surface display screen.

6. The system of claim 1, wherein the first given sub-area and the second given area of the display screen comprises a continuous section of the display screen.

7. The system of claim 1, wherein the first given area includes a first tilette and the second given area includes a second tilette adjacent to the first tilette.

8. The system of claim 7, wherein the first given area further includes at least a portion of the second tilette.

9. The system of claim 1, wherein the first given area includes a portion of a first tilette and the second given area includes a portion of the first tilette.

10. The system of claim 7, wherein each tilette is a distinct panel comprising one or more columns, regions or dots of phosphor.

11. The system of claim 7, wherein the reference marks are contained within the tilettes.

12. The system of claim 1, wherein the continuous surface display screen comprises a plurality of contiguous tilettes.

13. The system of claim 1, wherein the continuous surface display screen comprises a plurality of tilettes and each servo system determines the position of a tilette relative to the tilette's corresponding light engine module.

14. The system of claim 1 wherein the control unit is configured to:
  detect first servo laser beam feedback light to determine a position of the first light engine module relative to an adjacent second display screen region;
  detect second servo laser beam feedback light to determine a position of the second light engine module relative to the adjacent second display screen region; and
  simultaneously image a portion of the adjacent second display screen region using an excitation laser beam emitted by a corresponding light engine module and a light engine module that corresponds to the adjacent display screen region.

15. A method for aligning a scanning beam display system, comprising:
  providing a display system comprising a display screen having a plurality of display screen regions each with a corresponding light engine module having a servo laser beam and an excitation laser beam;
  detecting first servo laser beam feedback light to measure an alignment error of the first light engine module relative to the first light engine module's corresponding display screen region;
  detecting second servo laser beam feedback light to measure an alignment error of the second light engine module relative to the second light engine module's corresponding display screen region; and
  adjusting alignment of the excitation laser beam of the first light engine and the excitation laser beam of the second light engine based on the corresponding measured alignment error of the first and second light engines.

16. The method of claim 15, wherein an outer scanning region includes an adjacent display screen region.

17. The method of claim 16, wherein detecting first or second servo laser beam feedback light comprises detecting servo laser beam feedback light reflected by reference marks positioned on the adjacent display screen region to determine a position of the servo laser beam.

18. The method of claim 17, wherein the reference marks are selected from start of line reference marks, end of line reference marks, and vertical reference marks.

19. The method of claim 15, wherein adjusting alignment of the excitation laser beam comprises at least one of shifting the excitation laser beam vertically by an adjustment of a galvo mirror and shifting the excitation laser beam horizontally by adjusting timing of a pulse on/off in conjunction with a known position of the excitation laser beam.

20. A method for aligning a scanning beam display system, comprising:
  providing a display system comprising a display screen having a plurality of display screen regions each with a corresponding light engine module having a servo laser beam and an excitation laser beam;
  detecting servo laser beam feedback light to determine a position of the first light engine module relative to an adjacent second display screen region;
  detecting servo laser beam feedback light to determine a position of the second light engine module relative to the adjacent second display screen region; and
  simultaneously imaging a portion of the adjacent second display screen region using an excitation laser beam emitted by a corresponding light engine module and a light engine module that corresponds to the adjacent display screen region.

* * * * *